United States Patent [19]
Root

[11] Patent Number: 5,606,674
[45] Date of Patent: Feb. 25, 1997

[54] GRAPHICAL USER INTERFACE FOR TRANSFERRING DATA BETWEEN APPLICATIONS THAT SUPPORT DIFFERENT METAPHORS

[75] Inventor: Kenneth A. Root, Portland, Oreg.

[73] Assignee: Intel Corporation, Santa Clara, Calif.

[21] Appl. No.: 367,934

[22] Filed: Jan. 3, 1995

[51] Int. Cl.$^6$ ............................................. G06F 3/00
[52] U.S. Cl. ............................ 395/346; 395/348
[58] Field of Search ................... 395/155–161, 395/146, 149; 345/117–120, 173–183; 382/309–311, 181–189

[56] References Cited

U.S. PATENT DOCUMENTS

| | | | |
|---|---|---|---|
| 5,148,155 | 9/1992 | Martin et al. | 345/173 |
| 5,157,763 | 10/1992 | Peters et al. | 395/157 |
| 5,251,291 | 10/1993 | Malcolm | 395/155 X |
| 5,260,697 | 11/1993 | Barrett et al. | 345/173 |
| 5,301,268 | 4/1994 | Takeda | 395/157 |
| 5,491,495 | 2/1996 | Ward et al. | 345/173 |
| 5,491,784 | 2/1996 | Douglas et al. | 395/159 |

OTHER PUBLICATIONS

Microsoft Windows for Pen Computing 1.0a OEM Adaption Kit Release Notes, Microsoft Corp., 1992, 1–12.
Guide to Pen Computing: Microsoft Windows for Pen Computing, 1992, pp. 1–47, 77–90, 151–159.
Cowart, "Mastering Windows 3.1", Sybex Inc., 1993, pp. 63–68.

*Primary Examiner*—Mark R. Powell
*Assistant Examiner*—John E. Breene
*Attorney, Agent, or Firm*—Blakely, Sokoloff, Taylor & Zafman

[57] ABSTRACT

User interface methods are described. A first user interface method allows the user of a pen-based computer to enter ink data to a target program that does not support ink data. A second user interface method allows a user to transfer data between a source program and a target program. Both user interface methods utilize a redirector program that sends selected data as a series of input messages, wherein each input message corresponds to the keystroke of a keyboard. Thus, the redirector program simulates keystrokes. For pen-based computers, a user interface method that uses a one-terminal redirector program provides a data entry front end that allows the user to enter ink data, translate the ink data to ASCII data, and to send the translated data to the a target program that does not support ink data. For most other embodiments, a user interface method that uses a two-terminal redirector program allows the transfer of data between source and target programs without concerns of incompatible data formats.

23 Claims, 27 Drawing Sheets

GRAPHICAL USER INTERFACE FOR TRANSFERRING DATA BETWEEN APPLICATIONS THAT SUPPORT DIFFERENT METAPHORS

FIELD OF THE INVENTION

This invention relates generally to the field of graphical user interfaces and more specifically to graphical user interfaces that allow a user to enter data in a computer application that does not support the mode or metaphor of data entry.

ART BACKGROUND

Pen-based computer systems operate according to a simple "pen metaphor" that allows a user to enter data by using a pen to "write" directly on the display device of the pen-based computer. The pen may be a light pen or a device shaped like a pen that facilitates data entry on a position-sensitive display device. The process of entering data for pen-based computers is often called "inking," and the data entered by inking is typically known as "ink data."

Pen-based computers provide the user with a simple mechanism for entering data quickly without the requirement that the user be a proficient typist. The ink data may be transcribed at a later time using "recognition" software that "recognizes" handwritten characters and translates them into a desired font or ASCII characters. Unrecognized ink data are typically treated as graphical objects rather than as text. Because much of the pen-based application software supports inking, a keyboard is not required for data entry. Thus, the total size of a pen-based computer can be greatly reduced when compared to a computer system having a keyboard for an input device.

Not all software that is executed by a pen-based computer system necessarily supports inking. For example, the operating system of the pen-based computer may not support inking. One solution to this problem is the On-Screen Typewriter sold by Microsoft® Corporation as part of the Pen Windows® software package. The On-Screen Typewriter provides the user with a graphical representation of a typewriter that allows the user to "type" data into the currently selected application or "active" window. The user types in data by selecting the desired characters using the light pen. This process is slow and cumbersome and destroys many of the advantages of the pen metaphor.

An additional problem that may be encountered by the user of a pen-based computer is that some application programs use higher quality recognition programs than other application programs. For example, some application programs allow "deferred" recognition, while other applications perform recognition immediately. The recognition process can interrupt the process of inking, forcing the user to wait for recognition to occur before continuing to "write" the next word. Deferred recognition is therefore preferable because it allows the user to "write" without interruption and to recognize the ink data when convenient. Further, some recognition programs are "destructive" in that the ink data objects cannot be recovered once they have been recognized, wherein other recognition programs are "non-destructive" and allow the recovery of the ink data objects after they have been recognized. Non-destructive recognition programs are typically preferable.

A further difficulty encountered by the user of pen-based computers is that ink data is often difficult to export to another application program. When inking, a pause in the movement of the light pen or the lifting of the light pen from the display device can cause a separate ink data structure to be created. Thus, a single sentence or a single word may consist of several data structures. For some application programs such as Microsoft Notebook, only one data structure may be exported at a time using a "cut-and-paste" export method. For example, a user inks the word "notes" in a document using an application program that supports deferred recognition of the ink data. At a later time, the user desires to export the contents of the inked document to a word processor program that does not support inking. To export the word "notes," the user first selects the word "notes" for transcription into text. When the user attempts to select the entire word "notes," he discovers that the application program has divided the word "notes" into two distinct objects, one including the letters "no," and the other including the letters "tes." Each letter grouping typically must undergo the recognition process separately. After recognition, the letter groupings remain separate objects, and typically there is no mechanism for grouping several transcribed text objects into a single object. Thus, the user must select one letter grouping, perform a "copy" operation, leave the application program, select the word processor, and "paste" the object into the target document. The "copy-and-paste" process is repeated for each object, which can be a time-consuming process.

SUMMARY OF THE INVENTION

Wherein it is desirable to provide a user of a pen-based computer with a mechanism for entering data into computer programs that do not support ink data, a method for entering data into a target program is described. A dialog box that supports ink data entry is generated and displayed on the display of the computer system. A task list is generated and displayed so that the user may select the target program. The user may then enter ink data in the dialog box. When ink data entry is complete, the user may cause the ink data to be translated into ASCII characters. Once recognition occurs, the user may cause the translated ink data to be sent to the target program, wherein the translated ink data arrives at a current cursor position for the target program. The mechanism for sending data to the target program may be input messages, which are commonly used to indicate input by input devices such as keyboards. The method may be adapted to allow portability of data structures according to a particular metaphor to target programs that do not support that particular metaphor. For example, the present method may be adapted to allow voice data entry, wherein the target program does not support voice recognition.

Wherein it is desirable to provide a convenient mechanism for transferring data between application programs, a method for transferring data from a source program to a target program is described. The source and target programs are selected by the user. The source program may automatically selected to be that of the currently active window. Alternatively, the source program may be selected with the target program from a task list displayed by the computer. To transfer data from the source program, the user selects the window of the source program so that the data of the source program may be selected. If the selected data is ink data, the user causes the ink data to be translated to ASCII characters before transfer to the target program. Data transfer may be performed in a number of different ways. According to one embodiment, a sensitive area is displayed in the window of the source program, and the user drags and drops the selected data into the sensitive area, whereby the selected data is transferred to the current cursor position of the target program. Alternatively, the selected data may be sent to the target program by selecting an appropriate icon or pushbutton control. The process of selecting the selected data indicates that only the selected data is to be sent to the target program, and data transfer may take place once the appropriate control is enabled. Again, the mechanism for transferring data from the source program to the target program may be the input message.

BRIEF DESCRIPTION OF THE DRAWINGS

The objects, features, and advantages of the method and apparatus of the present invention will be apparent from the following detailed description of the invention in which.

DETAILED DESCRIPTION

A graphical user interface (GUI) method is described wherein a user may transfer data to a target application program or operating system. The described GUI may be adapted to provide the direct transfer of data between two concurrently running applications programs, or the GUI may be adapted to provide a front-end data entry mechanism whereby the user enters data into the front-end for transfer to the target program. The GUI method uses a redirector program that transfers selected data to the target program as a series of input messages, wherein each input message corresponds to the keystroke of a keyboard. Thus, the output of the redirector program emulates a keyboard. The described GUI may be of particular use wherein the target program does not support or recognize the mode of data entry, which may occur, for example, when a user of a pen-based computer desires to enter ink data to a target program that does not support the pen metaphor. The described GUI thus provides for the transfer of data between programs that support different metaphors.

Figure 1:
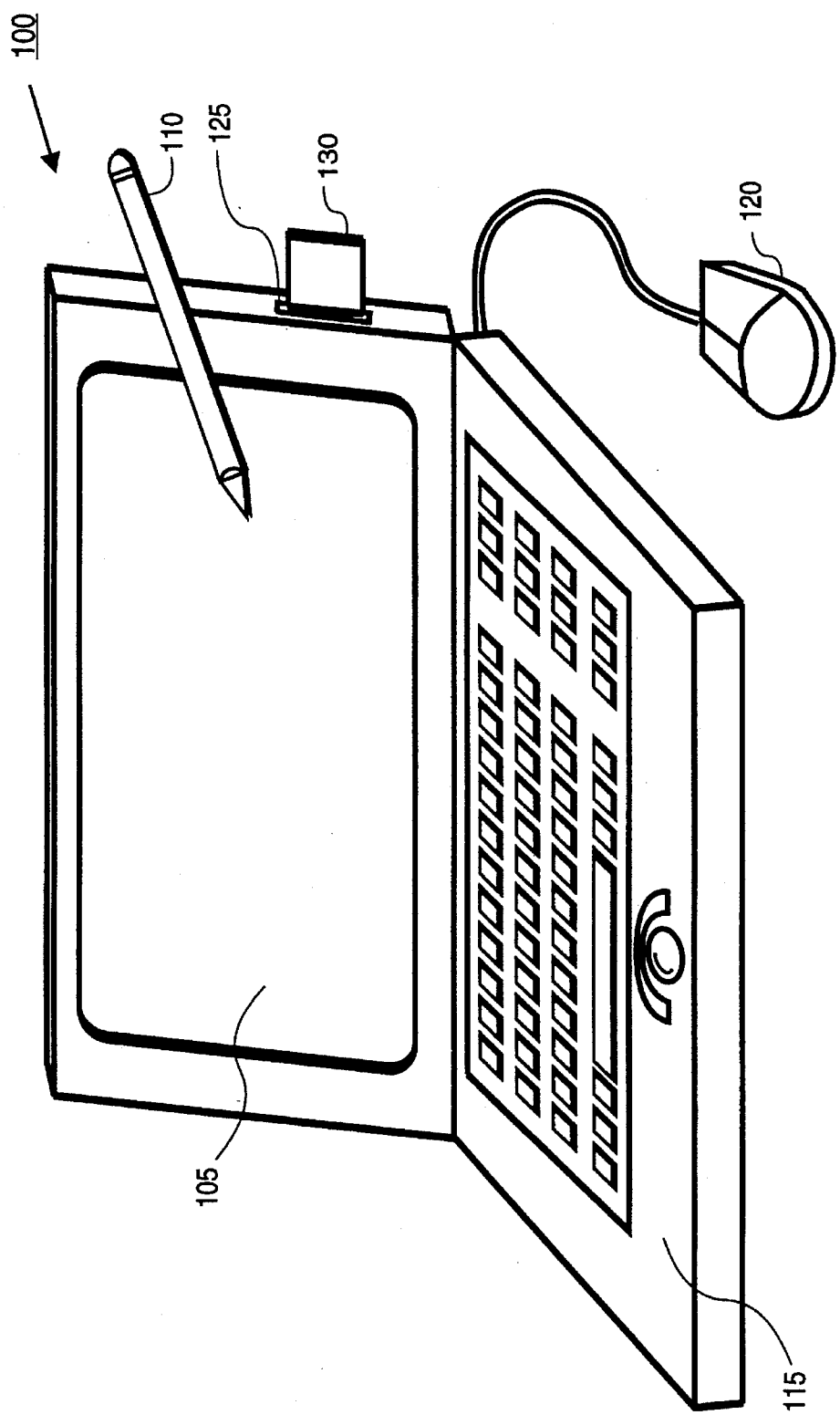
FIG. 1 shows a computer system that provides for the entry of ink data.

FIG. 1 shows a computer system 100 that provides for the entry of ink data. The computer system 100 includes a display device 105 having a display region that is sensitive to pen 110. By placing the pen 110 on the display region of the display device 105, the user may enter data into the computer 100 as if writing on a sheet of paper. The pen 110 may be a light pen. If the display device 105 is position-sensitive, the pen 110 may simply be a pen-shaped device that facilitates data entry.

The computer system 100 also includes a detachable keyboard 115 and a detachable mouse 120. When the detachable keyboard 115 and the detachable mouse 120 are attached to the computer system 100, the computer system 100 acts as a standard desktop or portable computer system. When the keyboard 115 and the mouse 120 are removed, the primary mechanism for entering data is the pen 110, and the computer system 100 functions metaphorically as a notepad or a clipboard. Included, but not shown in the computer system 100, are a central processing unit (CPU), a mass storage device, and system memory. The computer system also may include one or more slots 125 each accepting a PCMCIA card 130. PCMCIA cards may act as memory storage devices or as functional devices such as fax/modems.

Figure 2:
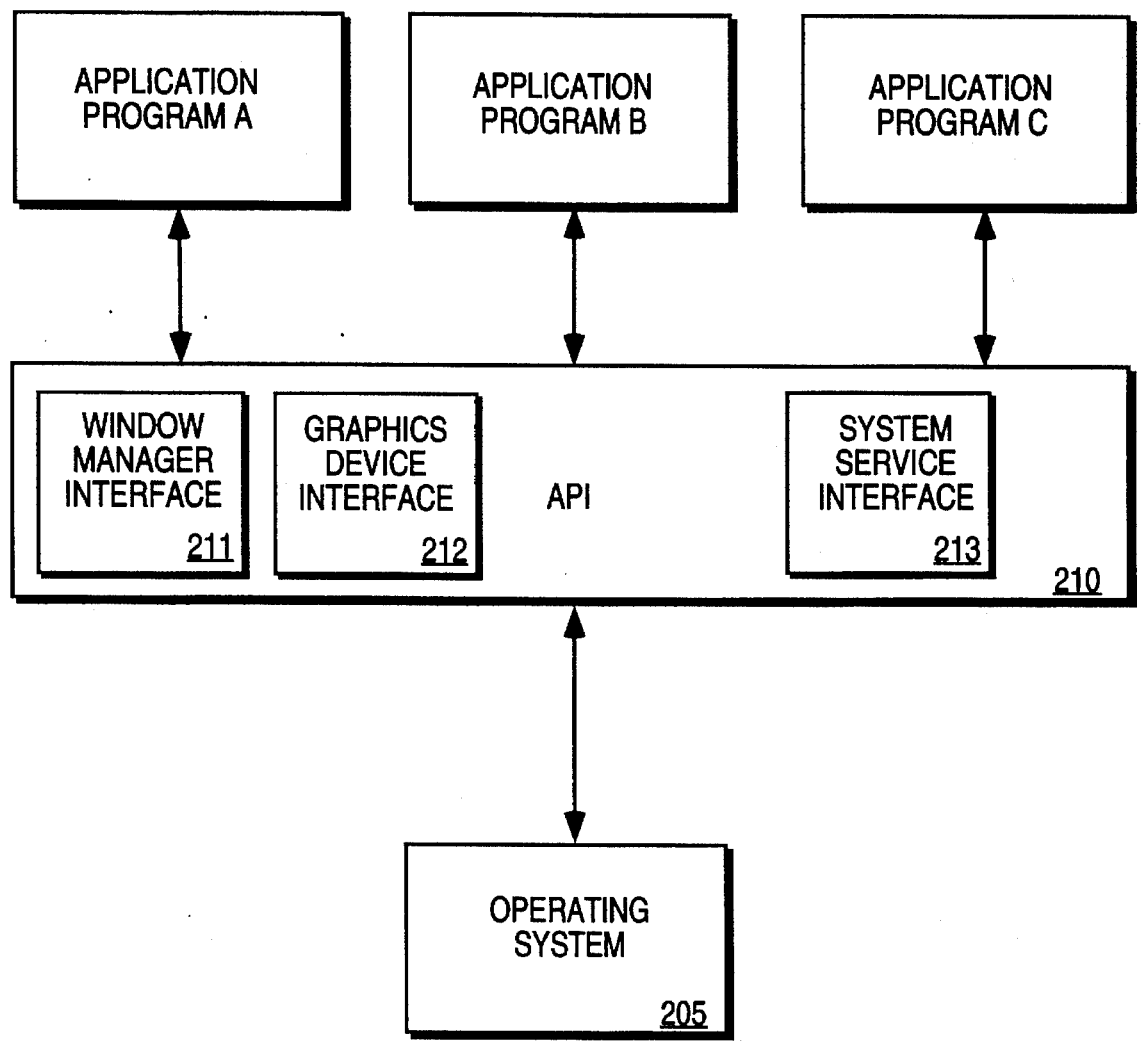
FIG. 2 shows the operation of the computer system in block diagram

The computer system 100 is capable of executing multiple application programs simultaneously. FIG. 2 shows the operation of the computer system 100 in block diagram form. As shown, application program A, application program B, and application program C each interface with the operating system 205 via an application programming interface (API) 205. Wherein the CPU of the computer system 100 is an Intel microarchitecture processor such as the Intel Pentium® processor, the API 210 itself may be an application program such as Microsoft® Pen Windows®. Alternatively, the functions of the API 210 may be performed by the operating system software. For the purposes of simplifying discussion, the use of the term "API" contemplates the API 210 being either a separate application program or part of the operating system software 205.

The API 210 allows application programs that are running simultaneously in the computer system to share hardware resources. The API 210 may include several different interfaces, such as a window manager interface 211, a graphics device interface 212, and a system services interface 213.

The window manager interface 211 contains the functions that create, move, and alter a window that is displayed on the display device 105. A window is a rectangular region associated with an application program or the operating system that contains graphical representations of user input, input options, and system output. For a menu-driven environment, the window manager interface 211 is responsible for creating menus, altering the contents of menus, and obtaining the status of menu items.

The graphics device interface 212 contains the functions that perform device-independent graphics operations within an application program. These functions create a wide variety of line, text, and bitmap output on a number of different output devices. The graphics device interface 212 allows an application to create pens, brushes, fonts, and bitmaps for specific output operations.

The system services interface 213 contains the functions that access code and data in modules, allocate and manage memory, manage tasks, load program resources, and translate strings from one character set to another. Further, the system services interface 213 is responsible for carrying out communications through the computer systems I/O ports, creating and opening files and creating sounds using the system sound generator.

Figure 3:
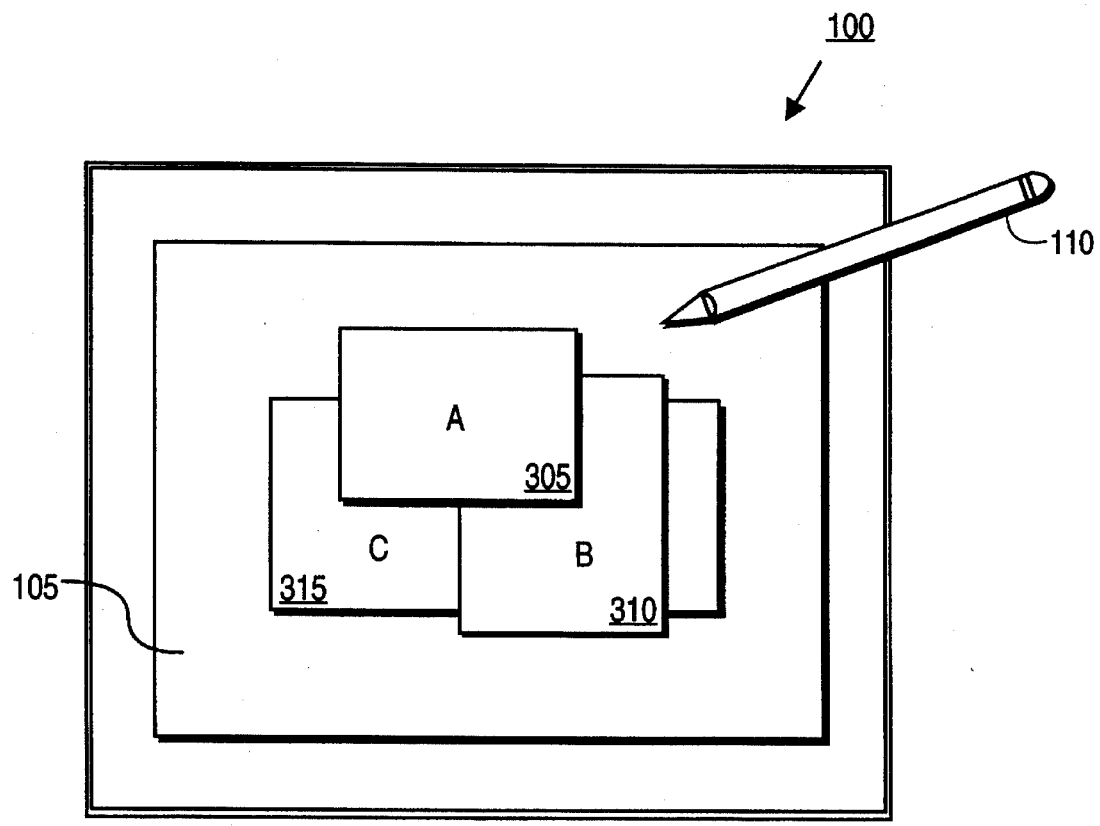
FIG. 3 shows the windows of a display as corresponding to different application programs.

As shown in FIG. 3, each of the application programs A–C may correspond to one or more windows that are displayed on the display device 105. For example, application program A is displayed in window 305, application program B is displayed in window 310, and application program C is displayed in window 315. Wherein the computer system 100 is shown as displaying multiple windows simultaneously, the computer system 100 may alternatively display only one window at a time.

Figure 4:
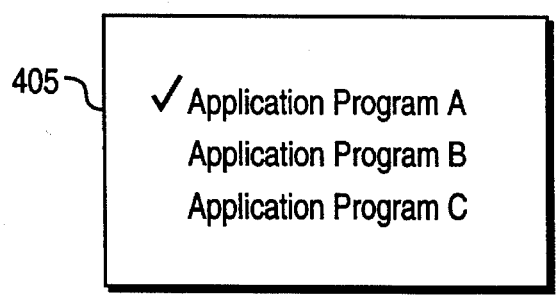
FIG. 4 shows a task list of the computer system

For each application program that is concurrently executed by the computer system 100, the API 210 maintains a process identification (process ID) and a task list that identifies the concurrently executing application programs. Referring to FIG. 4, the task list may be displayed as a menu 405 on the display device 105. A graphical indication such as a check mark may be used to indicate which of the currently executing application programs is in use by the user. The check mark in shows FIG. 4, that application program A is currently in use or "open". Returning to FIG. 3, application program A is also shown as having the "active" window 305. According to a desktop metaphor, the top window in a display is typically the active window such that a user's manipulation of input devices causes data entry in the active window. Alternatively, it is possible that no window is currently displayed for the open application program.

According to different GUI standards, it is typically possible to minimize a window for an application program to an icon. The window manager interface 211 of the API 210 typically provides for the opening of a window in response to a control sequence such as double clicking on the icon using the mouse 120 or the pen 110.

GUIs described herein utilize a "redirector" program to transfer data to a target program. A first type of redirector program is a "one-terminal" redirector program that provides a front-end data entry mechanism wherein the user enters data into the front-end and causes the redirector program to send the entered data to the target program. The one-terminal redirector program has "one" terminal in the sense that it is linked to only one other program. A second type of redirector program is a "two terminal" redirector program wherein data from a source program may be directly sent to the target program.

Each type of redirector program outputs input messages to the target programs to simulate the keystrokes of a keyboard. Input messages are messages sent by input devices such as keyboards, mice, and pens to the operating system. The operating system typically forwards received input messages to the application program that is associated with the active window, or "on top." The described GUI allows the user to select any program as a target program for the output of the redirector program, whether or not that selected target program is on top.

Figure 5:
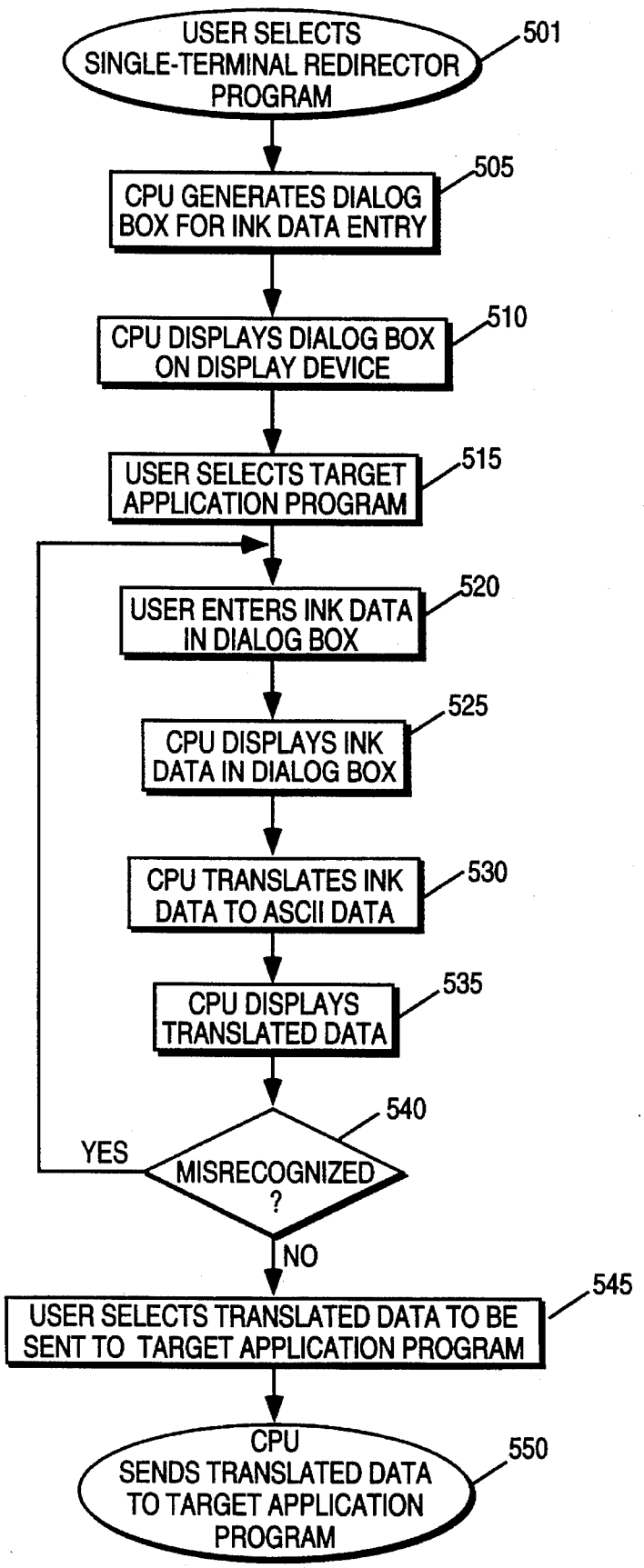
FIG. 5 is a flow chart showing a GUI method that allows ink data entry to programs that do not support inking.

FIG. 5 is a flowchart showing a GUI method that allows the entry of data according to a metaphor and the subsequent translation and transfer of the entered data to a target program that does not support the metaphor. The GUI method of FIG. 5 is useful when a user of a pen-based computer wishes to use a program that does not support the entry of ink data, but the user wishes or is required to enter data by using an electronic pen. At process block 501, the user selects the one-terminal redirector program. This may be done, for example, by selecting an icon that indicates the redirector application program using the pen 110.

As described above, the one-terminal redirector program provides a front-end data entry mechanism that allows the user to enter data using a device or metaphor that is not recognized or supported by the program that the user wants to use. Therefore, at process block 505, the CPU of the computer system 100 generates a dialog box for data entry by the user in response to the user's selection of the one-terminal redirector program at process block 501. The data field of the dialog box may allow for the entry of ink data. At process block 510, the CPU of the computer system causes the dialog box generated at process block 505 to be displayed in the display area of the display device 105. As shown in FIGS. 6B–6E, the dialog box may be a box-edit dialog box.

The user selects a target program at process block 515. According to one embodiment, the CPU generates and provides the user with a task list that specifies at least one application program as being currently executed by the computer system 100 to that the user may select the target program. The task list may be displayed as a pull-down menu at the command of the user. The task list preferably does not identify the ink redirector program as a possible target program. Alternatively, the user may select the desired target program simply by providing another dialog box for inking the name of the target program. Further, the target program may be indicated through using graphical indicators such as icons, rather than using text. A task list need not be separately generated; instead, the task list for the system may be used, and a separate indicator to indicate the target of the ink redirector program may be used in addition to the check mark which indicates the active application program.

At process block 520, the user enters ink data in the data entry field of the dialog box using the pen 110. The CPU displays the ink data in the dialog box at process block 525. At process block 530, the ink data is automatically translated into ASCII characters in response to the passage of a predetermined amount of time after ink data input has ceased, or in response to the user "lifting" the pen 110 from the display device 105. Alternatively, the CPU may translate the ink data at the command of the user. At process block 535, the CPU displays the translated ink data on the display device 105. At process block 540, if the ink data is misrecognized, the user may repeat process blocks 520–535. At process block 545, once the data has been correctly translated into ASCII characters, the user selects the translated data to be sent to the target program, and the CPU sends the translated data to the target program in response to the user's selection at process block 550. The translated data of the redirector program is treated by the target program as if they were entered by an input device such as a keyboard. In this manner, the pen metaphor of pen-based computers may be maintained even when entering data in application programs that do not support ink data entry. Process block 545 may be omitted if the redirector program is adapted to automatically send translated data once the data have been translated.

FIGS. 6A–6E illustrate the method for entering ink data into a target program as shown in FIG. 5. As described above, the fact that the computer system 100 supports the entry of ink data does not necessarily mean that every application program or the operating system provides for the entry of ink data. The method illustrated in FIGS. 6A–6D allows the user to enter ink data, to translate the ink data, and to transfer the translated ink data to a target program in a convenient manner.

Figure 6A:
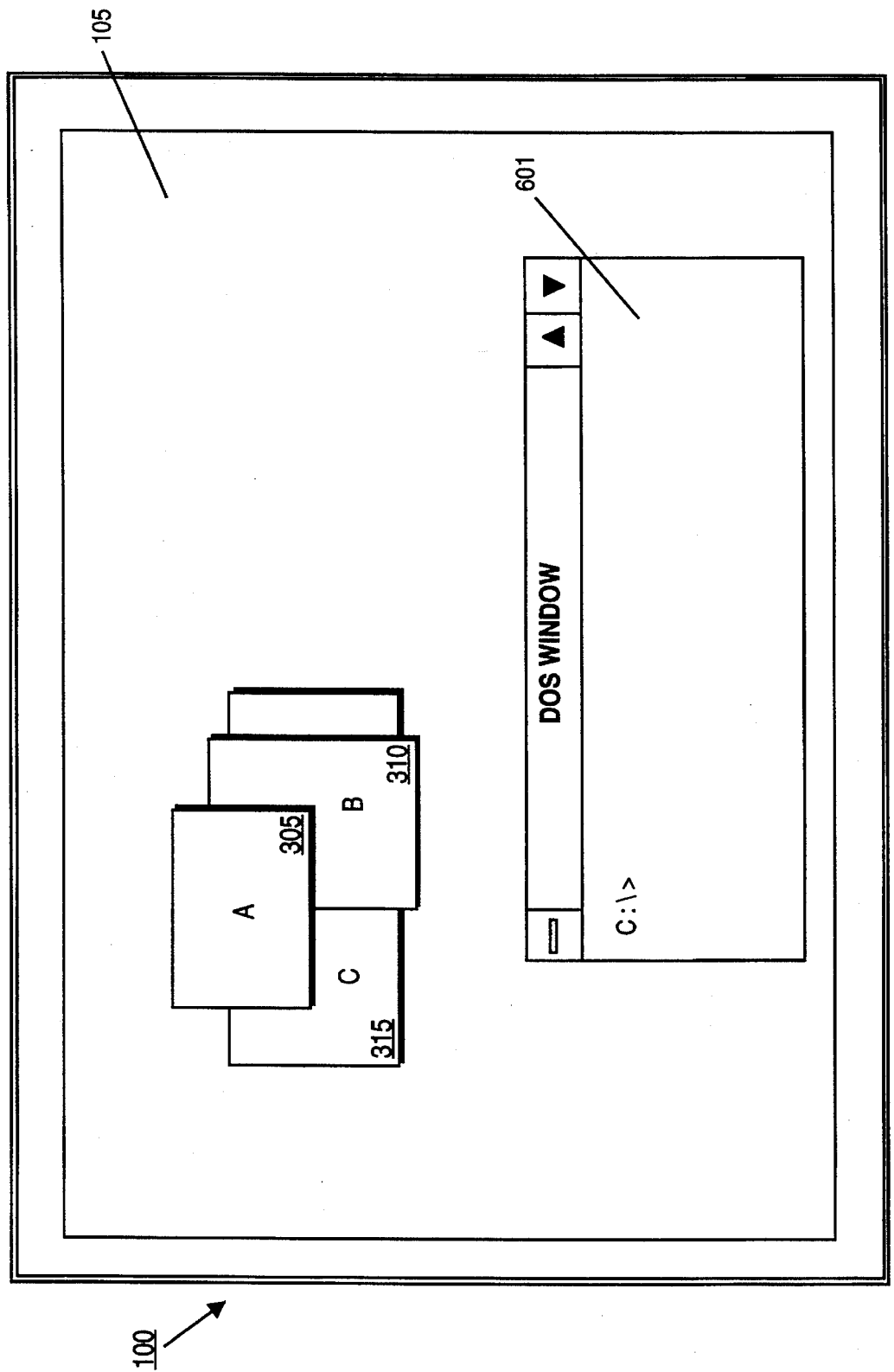
FIGS. 6A–6E illustrate the operation of the GUI method shown in FIG. 5.

FIG. 6A shows a window 601 displayed on the display device 105, wherein the window is associated with the disk operating system ("DOS") of the computer system 100. The DOS window 601 does not provide for inking. If the detachable keyboard 115 is attached to the computer system 100, data entry into the DOS window 501 may be done using the detachable keyboard 115; however, if the detachable keyboard 115 or some other equivalent device is not attached to the computer system 100, a mechanism should be provided to allow the user to enter data using the pen 110. Further, the provided mechanism should allow the user to maintain the "pen metaphor."

Figure 6B:
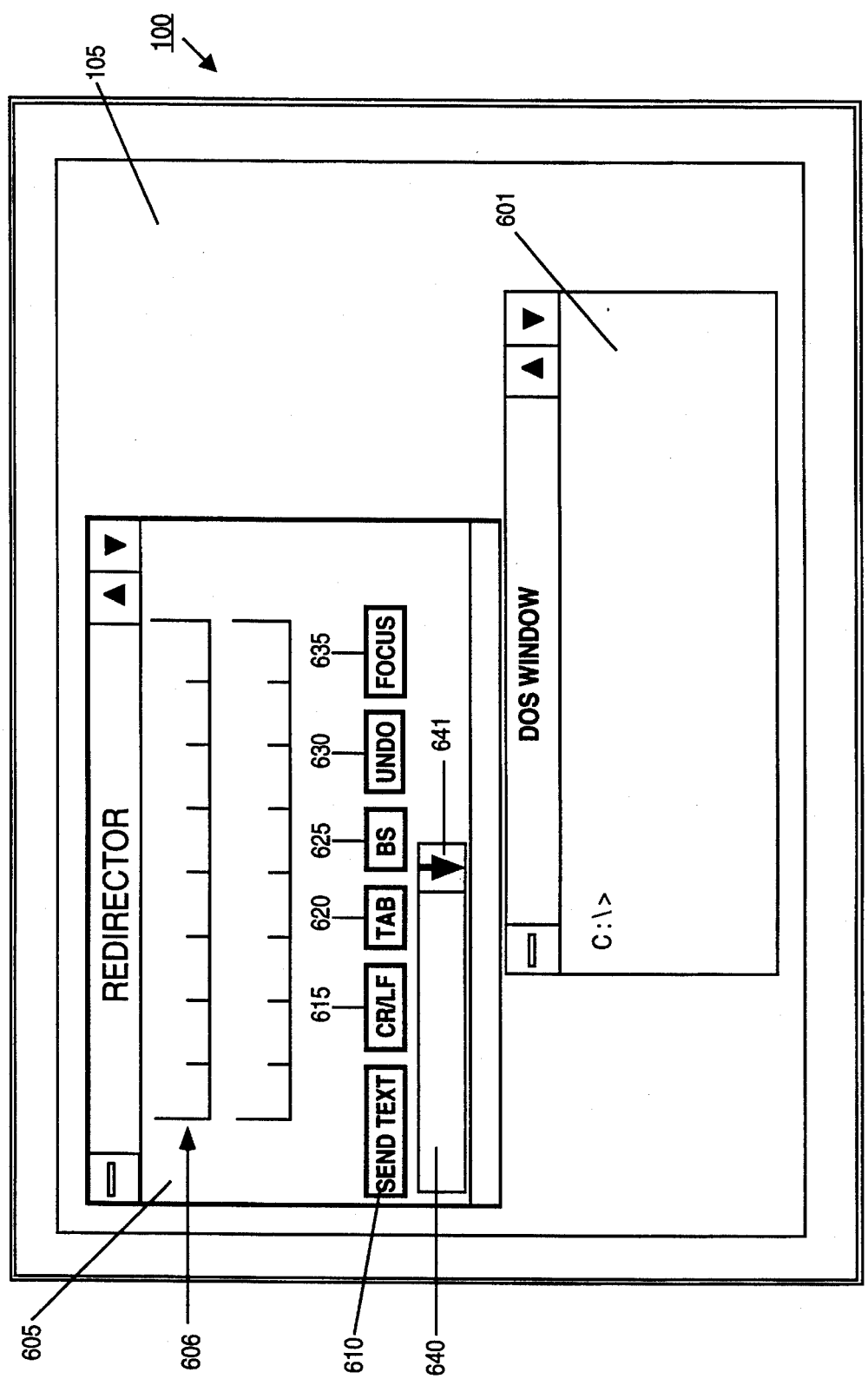

FIG. 6B shows a redirector window 605 that corresponds to a redirector application program. According to one method, an ink redirector application program is provided to allow the user to ink his input data, to translate the inked data into ASCII characters, and to send the ASCII characters as keystrokes of a keyboard to any other window. Thus, the ink redirector window 605 allows the entering of ink data into application programs that do not support or accept ink data by simulating keystrokes. This redirector window and associated redirector application program may find particular use when the application program of the target window does not support inking.

The ink redirector window 605 is shown as a "box-edit" dialog box wherein a "box" is provided for each ink character that is to be entered. Entering ink data into box-edit dialog boxes typically provides the best results for recognition of the ink data because the each "box" of the dialog box delimits the beginning and the end of a single ink character, which increases the likelihood that the recognition program will correctly recognize the ink data. Ink data entered into the box-edit dialog box may be recognized automatically if a predetermined amount of time has expired without further ink data entry.

As shown, the redirector window 605 may also include a number of "push-button" controls that may be activated by "pressing" on the graphical representation of the push-button control using the pen 110. The push-button controls are primarily provided as a convenience to allow the user more options when redirecting data that has been entered into the dialog box, and the push-button controls may be omitted. For example, SEND TEXT push-button 610 is used for sending recognized text from the data field 606 to the target program. The ink redirector application program may be configured to automatically send text to the target program as soon as it is recognized, but the inclusion of the SEND TEXT push-button 610 allows the user to verify the correct entry of ink data. Activation of CR/LF push-button 615 causes a carriage return to be entered in the window of the target program when activated. Again, the ink director application program may be configured to automatically enter a carriage return, but the CR/LF push-button 615 provides the user greater control. Activation of the TAB push-button 620 causes a tab to be inserted in the target program window when activated. Activation of the BS push-button 625 results in a back-space in the target program when activated. Activation of the "FOCUS" push-button control 635 causes the target application program to be brought to the top as the active window, and activation of "UNDO" push-button control 630 causes the removal of redirected ink data from the target application window. Additional push-button controls may optionally be provided.

Figure 6C:
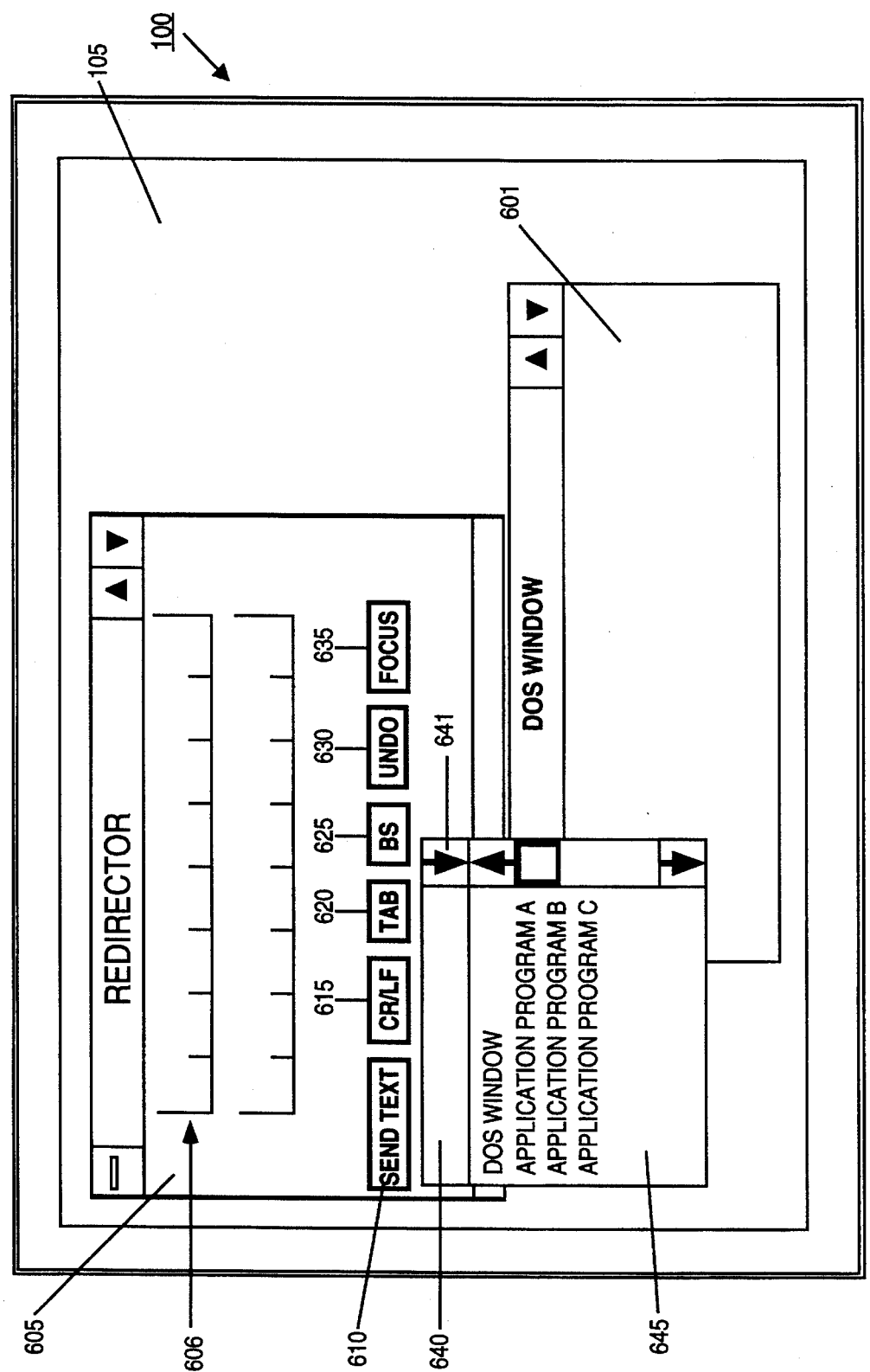

The ink redirector window 605 also includes a target program indicator field 640 wherein the name of the target program is displayed. To select the target program, a user selects a menu button 641 using the pen 110 which causes a pull-down menu 645 to appear on the display area of the display device 105. This is shown in FIG. 6C. The pull-down menu 645 is the task list for the computer system 100. The user selects the target program by highlighting the desired application program. For this case, an application program that does not support ink data is selected as the target by selecting DOS Window 601. With the exception of the ink redirector window 605, the user is allowed to select any target that is identified in the task list, regardless of whether the window for the target is active or minimized.

Figure 6D:
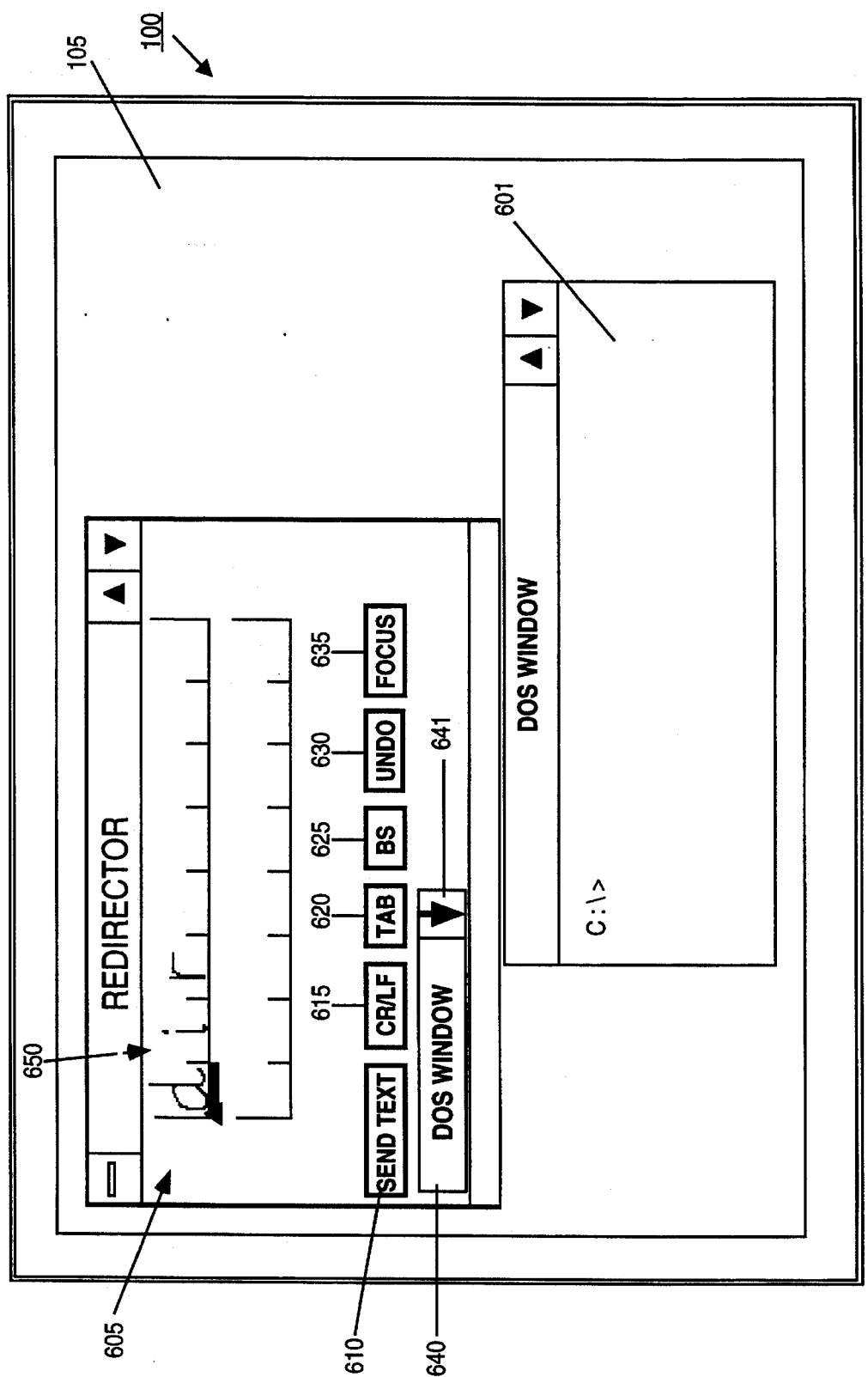

FIG. 6D shows ink data as entered in the data entry field 606. The target program indicator field 640 displays the DOS window as being the target program. Ink data 650 corresponding to a DOS "dir" directory command has been entered in the data entry field 606. One ink character is provided in each box. The ink data is automatically translated to ASCII data a predetermined time after the user ceases ink data input.

Figure 6E:
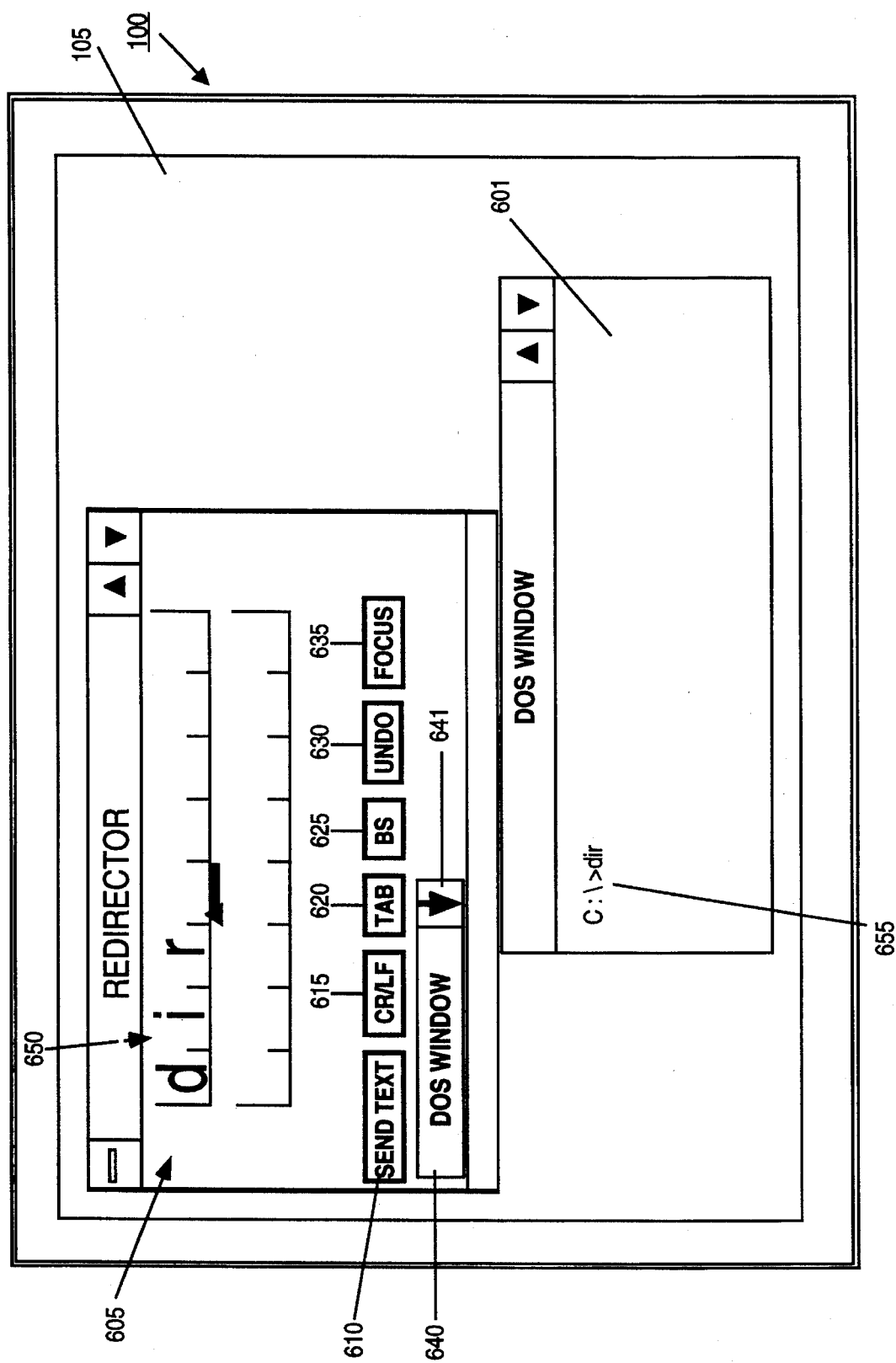

FIG. 6E shows the recognized ink data in ASCII form. Once the ink data has been translated to ASCII characters, the user causes the translated data 650 to be sent to the window of the target program (DOS window 601) by using the SEND TEXT push-button control 510. This causes the directory command "dir" 655 to appear in the DOS window 601 at the current cursor position. To execute the directory command "dir," the user selects the CR/LF push-button control 615 which acts as an "enter" key on a keyboard. As described above, the operations of sending the text to the target program and the subsequent entry of a carriage return may be performed automatically by the redirector program.

As described above, the two-terminal redirector program provides the transfer of data between two different application programs. The two-terminal redirector program may be used to accelerate the transfer of data between applications when compared to "copy and paste" GUI methods of the prior art. According to one embodiment, the two-terminal redirector program allows the user to select data in a source program, to "drag" the selected data to a sensitive area, and to "drop" the selected data in the sensitive area where it is transferred to the file of a target program. The sensitive area may be located in the window of the source program or on the desktop as a window. Alternatively, the redirector program may be adapted to recognize the dragging and dropping of selected text on an icon as indicating a request to transfer the selected data to the target program indicated by the icon, and no additional sensitive area need be generated and displayed. An alternative embodiment allows the user to select data by highlighting the data and to send the data using a push-button control. The two-terminal redirector program may be implemented as a separate program or as a part of a larger program such as a word processor or note-taker.

Figure 7:
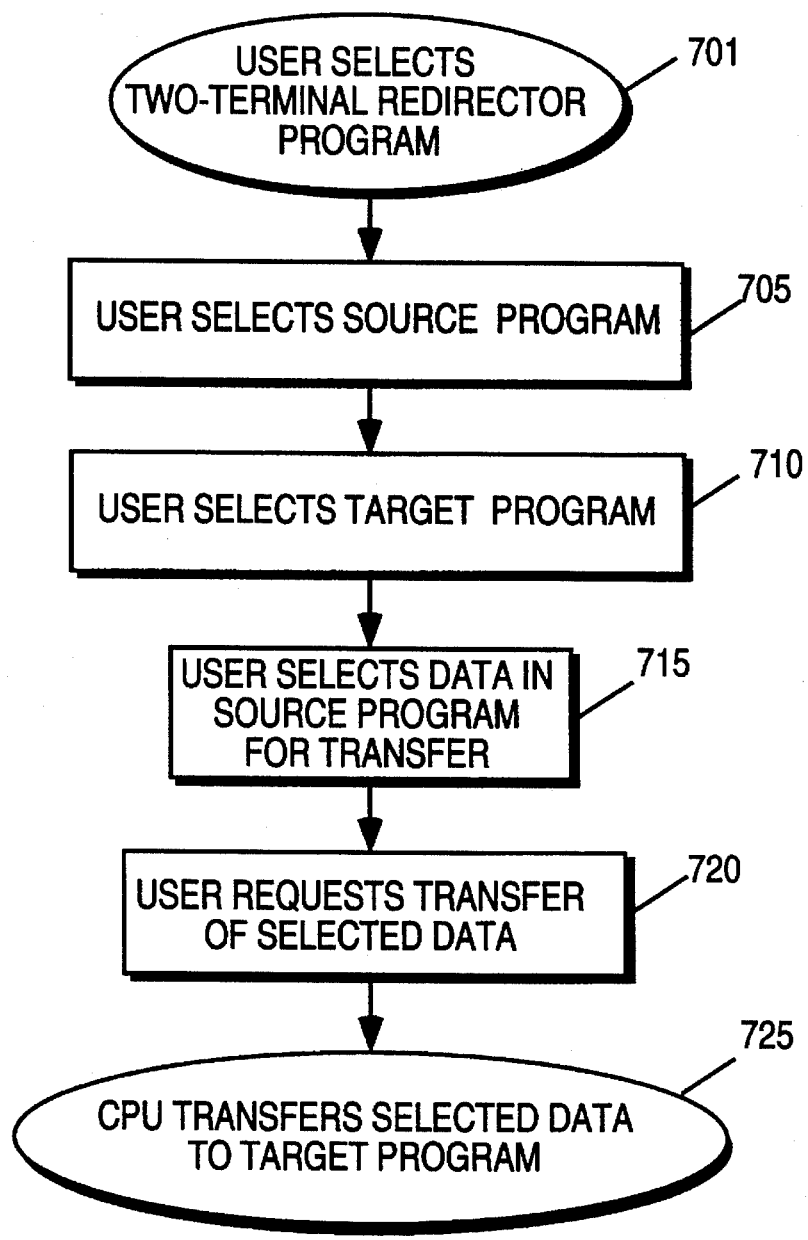
FIG. 7 is a flow chart showing a GUI method for transferring data between programs.
Figure 8:
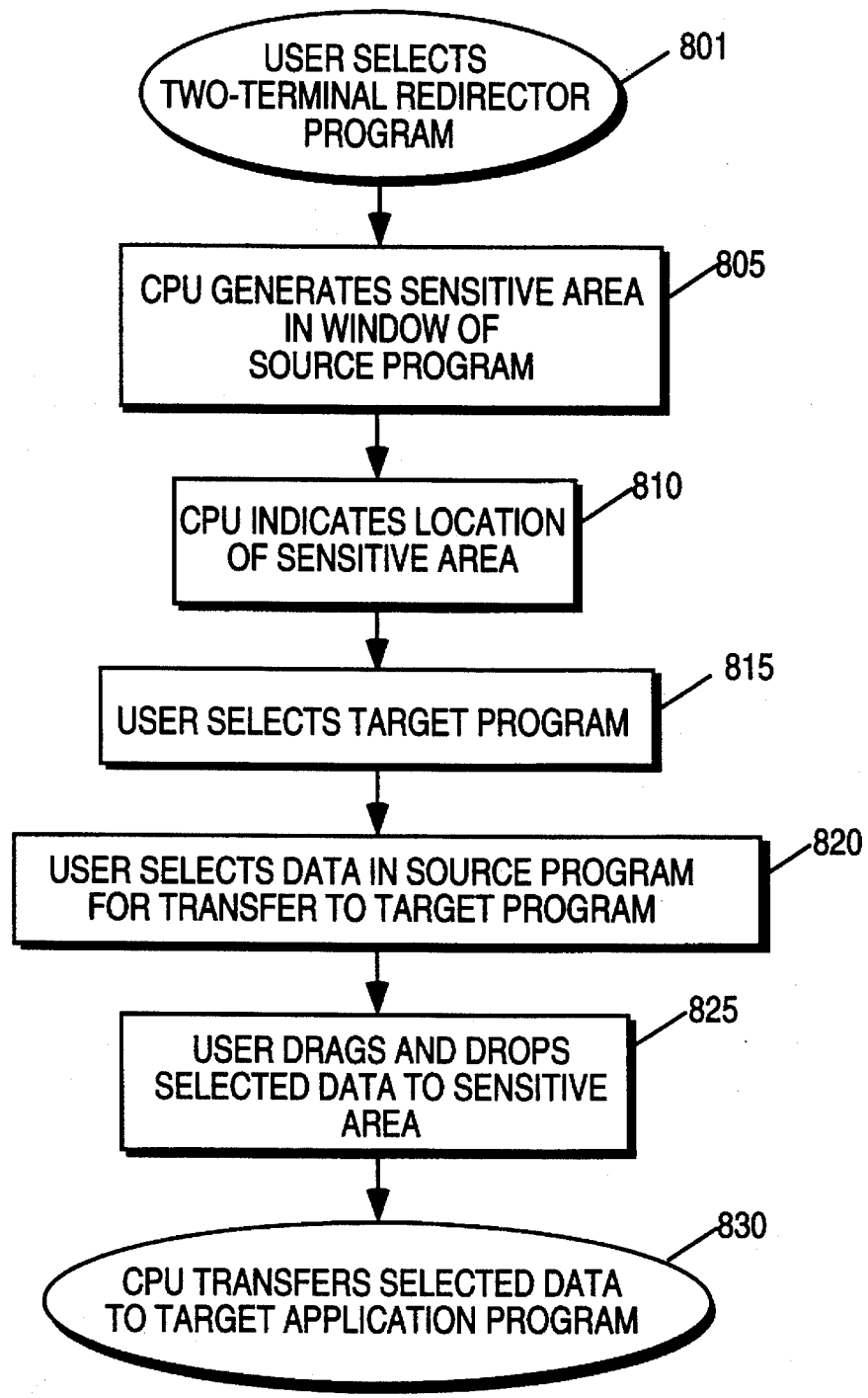
FIG. 8 is a flow chart showing a GUI method for transferring data between programs wherein a sensitive area is defined in the window of the source program.
Figure 9:
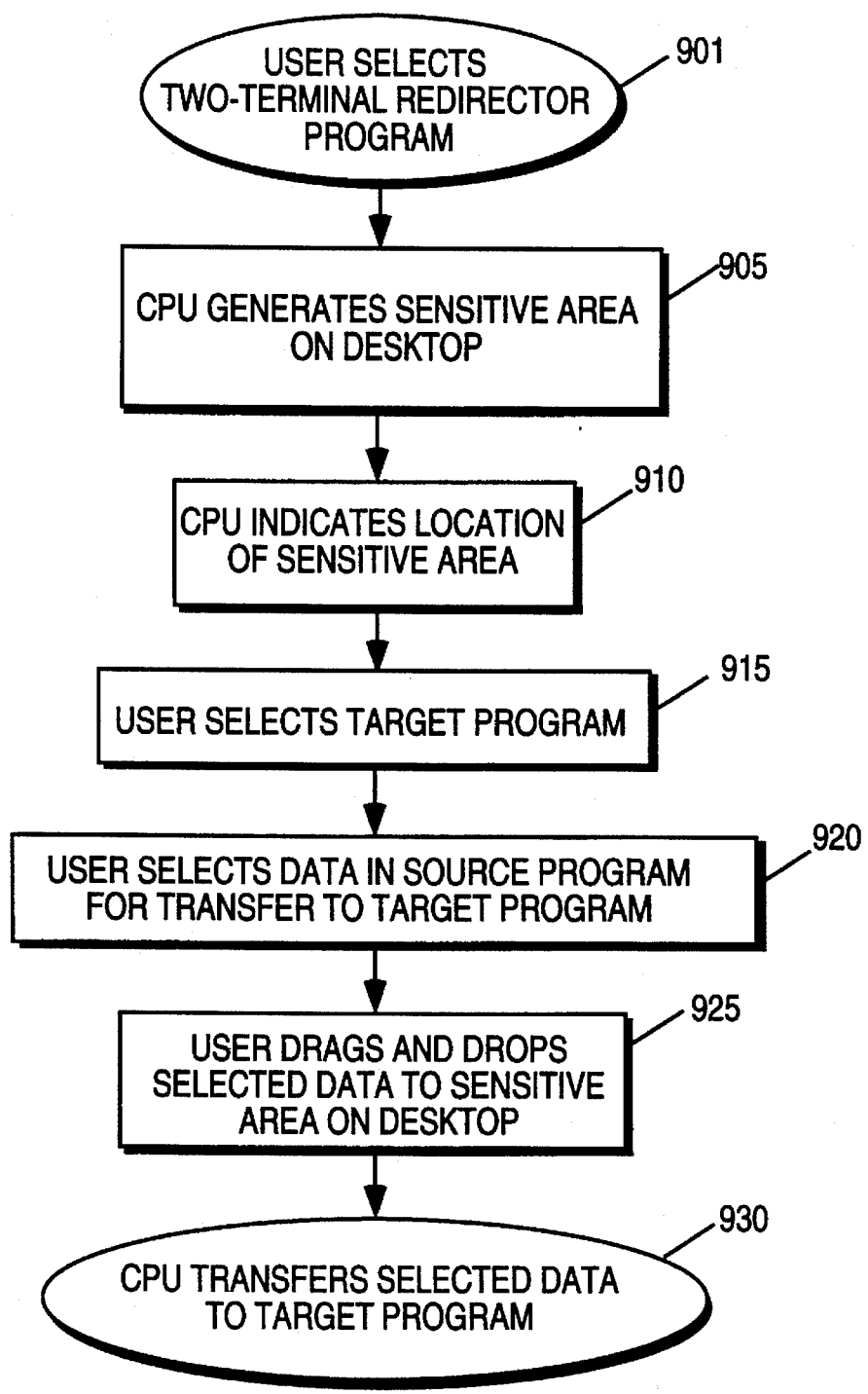
FIG. 9 is a flow chart showing a GUI method for transferring data between programs wherein a sensitive area is defined on the desktop.

FIGS. 7–9 are flow charts illustrating different embodiments of a GUI method that uses a two-terminal redirector program to transfer data between source and target programs. FIG. 7 is a flow chart illustrating a basic GUI method. At process block 701, the user selects the two-terminal redirector program. This may be done, for example, by using the pen 110 to select an icon that indicates the two-terminal redirector program. At process block 705, the user selects the source program. Depending on the specific implementation of the two-terminal redirector program, the source program may be automatically selected as the program in the active window, or the user may be prompted to select the source program. When the source program is automatically selected, changing the active window results in changing the source program. Wherein the user is prompted to select the source program, the two-terminal redirector program may provide a dialog box including a task list from which the user may select the source program. At process block 710, the user selects the target program. This may be done in a manner similar to that described with respect to the one-terminal redirector program.

At process block 715, the user selects data in the source program for transfer to the target program. Selection may be made by using the pen 110 to highlight the desired data. When the user wants to transfer data that is not in a format suitable for transfer as input messages, the user must first convert the data to the appropriate format. For example, ink data should first be translated before it is selected for transfer. At process block 720, the user requests the transfer of the selected data to the target program. According to one embodiment, the user requests selection by activating a push-button control that automatically copies and sends the highlighted text to the selected target program. According to other embodiments, the user indicates a transfer request by dragging the selected text to a sensitive area and dropping the selected text in the sensitive area, which may be an icon. At process block 725, the CPU transfers the selected data to the target program in response to the user's request.

FIG. 8 shows an embodiment of a GUI method wherein a sensitive area is created in the window of the source program. This embodiment may find particular use when the redirector program is implemented as part of the source program. At process block 801, the user selects the two-terminal redirector program. Wherein the redirector program is part of a larger source program, the step of selecting the redirector program may be performed by selecting the source program. At process block 805, the CPU generates a sensitive area in the window of the source program. The CPU indicates the location of the sensitive area at process block 810. The location of the sensitive area may be fixed such that the sensitive area does not move when the user scrolls through the window of the source program. At process block 815, the user selects the target program, which may be done by using a dialog box. At process block 820, the user selects data in the source program for transfer to the target program. At process block 825, the user drags the selected data to the sensitive area and drops the selected data into the sensitive area. At process block 830, the CPU transfers the selected data to the target program as a series of input messages, thus simulating the keystrokes of a keyboard.

FIG. 9 shows an embodiment of a GUI method wherein a sensitive area is created on the desktop. At process block 901, the user selects the two-terminal redirector program. At process block 905, the CPU generates a sensitive area in the desktop. The CPU indicates the location of the sensitive area at process block 910. The sensitive area may be displayed as a an icon, a dialog box, or other type of window. At process block 915, the user selects the target program, which may be done by using a dialog box. The flow chart of FIG. 9 assumes that the program of the active window (the program that is on top) is automatically selected as the source program. The process shown in FIG. 9 may be modified such that the user is prompted to select the source program. At process block 920, the user selects data in the source program for transfer to the target program. At process block 925, the user drags the selected data to the sensitive area and drops the selected data into the sensitive area. At process block 930, the CPU transfers the selected data to the target program as a series of input messages, thus simulating the keystrokes of a keyboard.

Figure 10A:
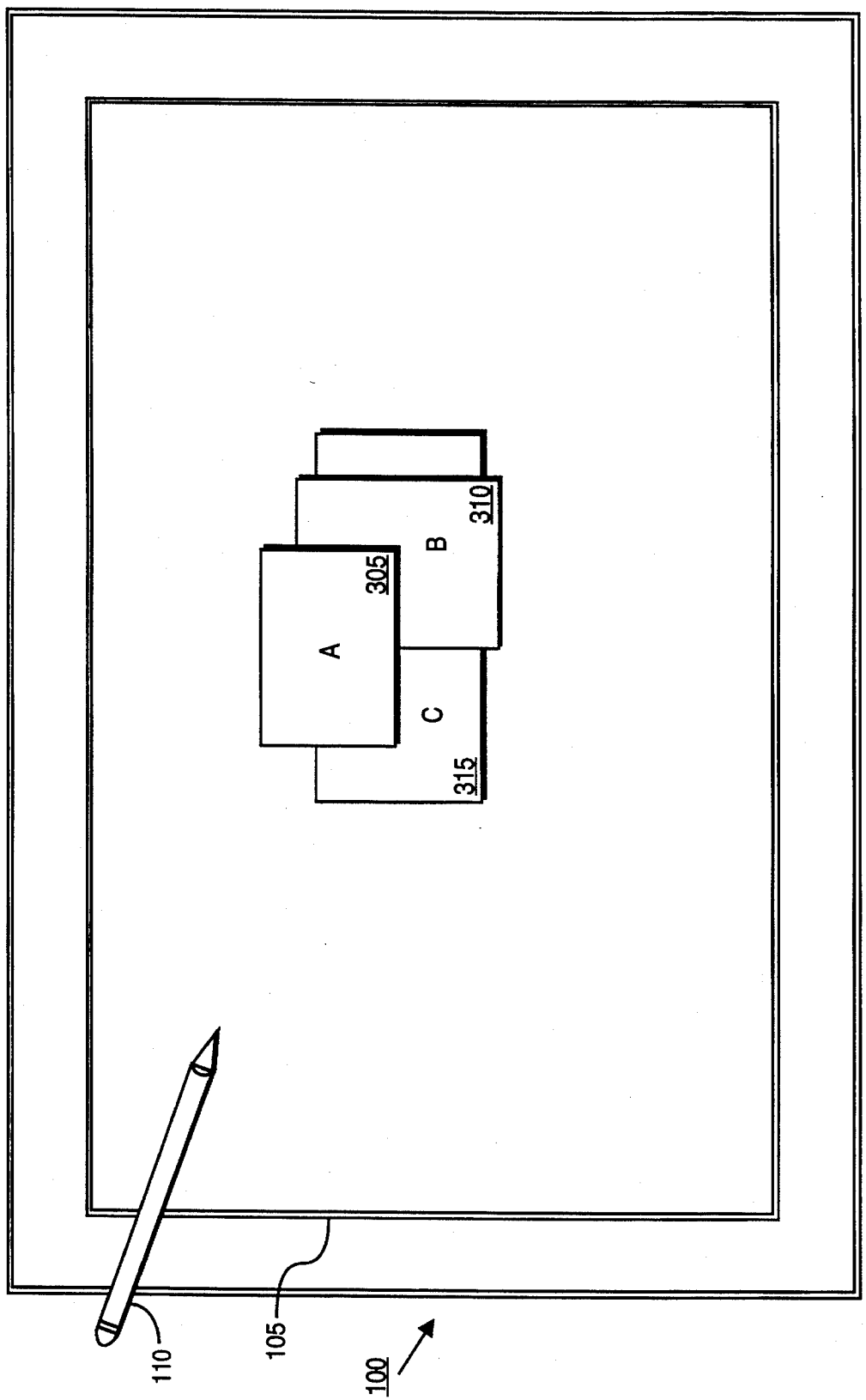
FIGS. 10A–10E illustrates operation of the GUI method shown in FIG. 7 according to one embodiment.
Figure 10B:
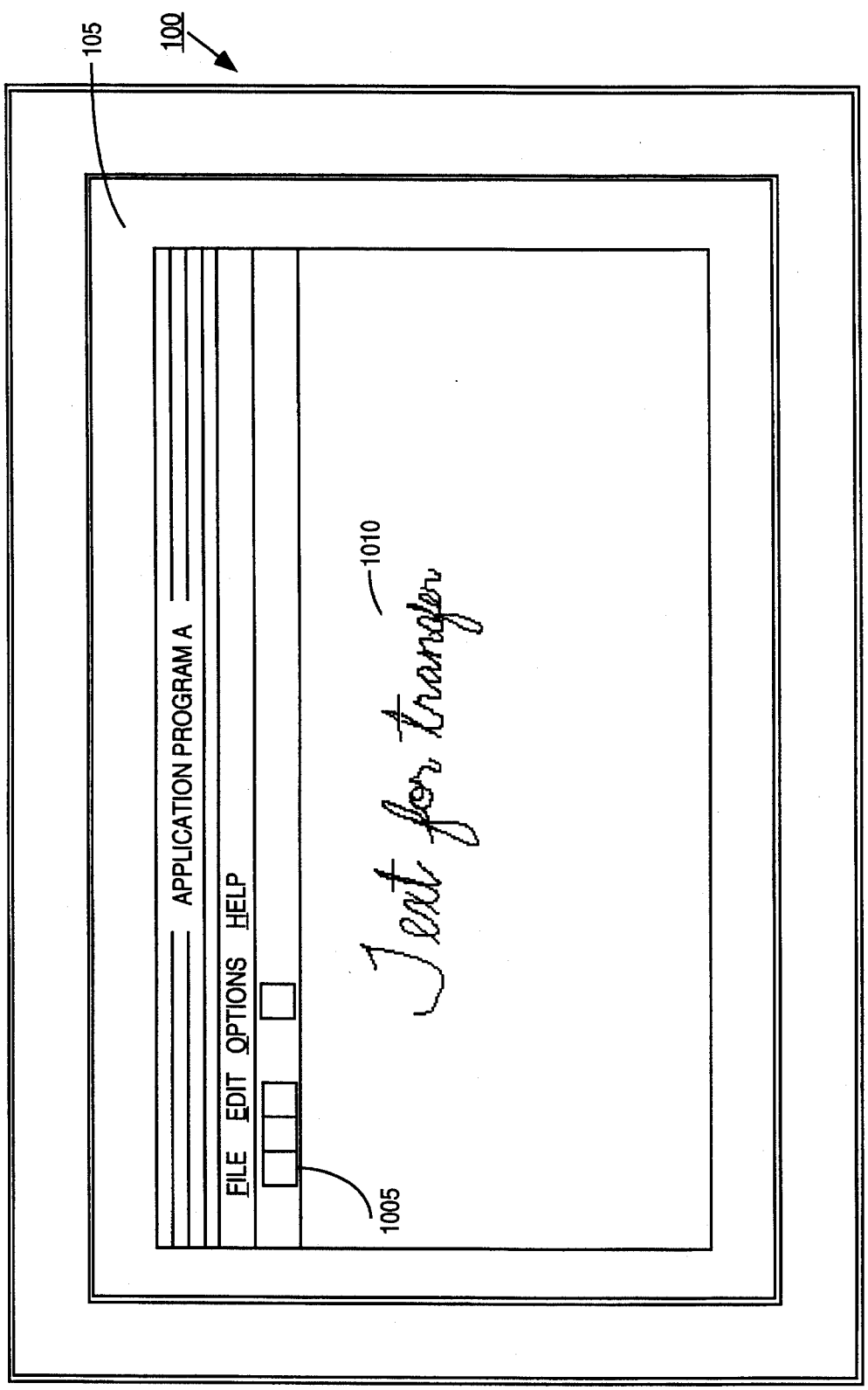
Figure 10C:
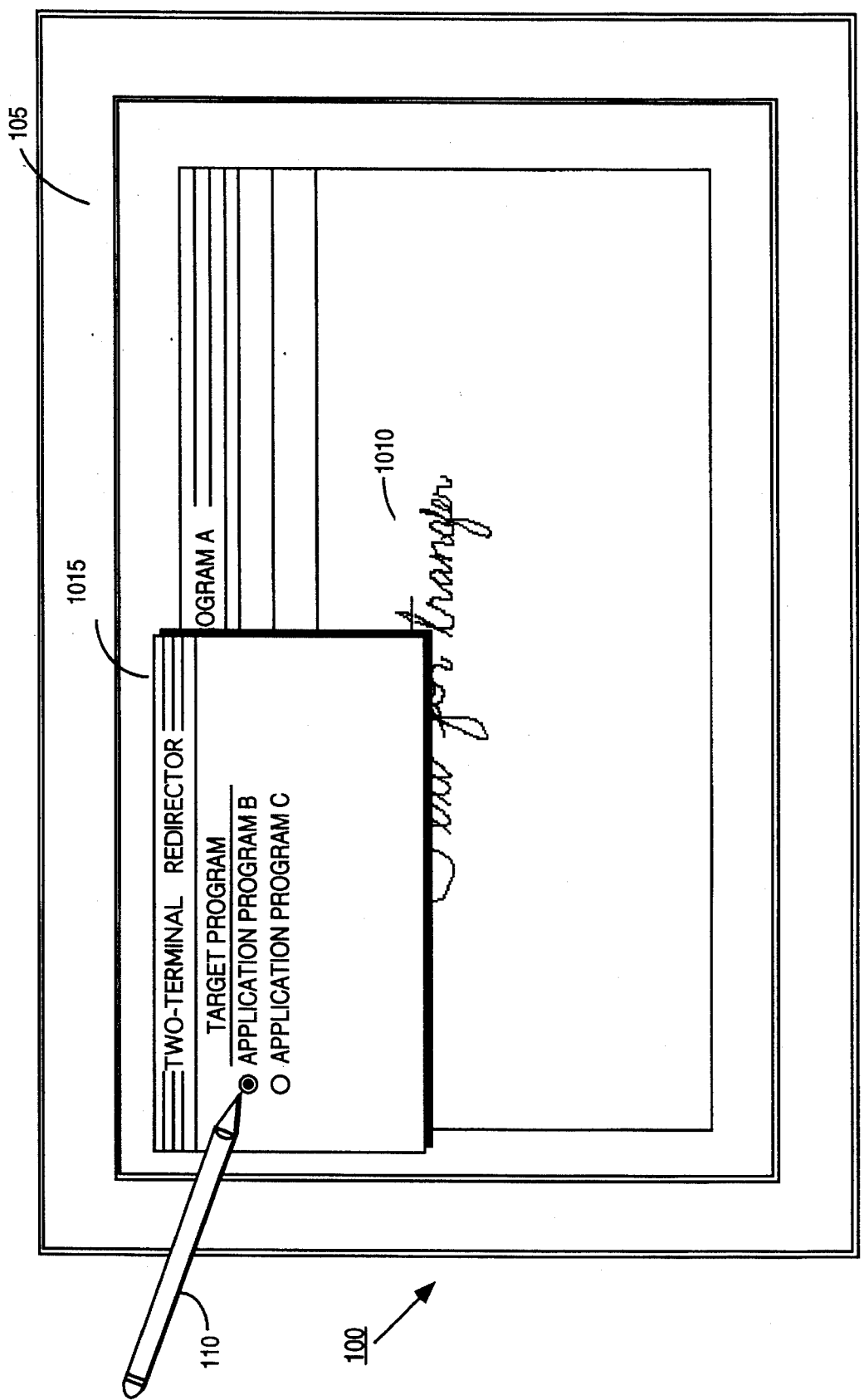

FIGS. 10A–10E illustrate one embodiment of the GUI process shown in FIG. 7, wherein a push-button control is used to request transfer of the selected data. FIG. 10A shows the pen-based computer 100 wherein windows for application programs A, B, and C are currently open. The user selects window 305 of application program A as the active window, as shown in FIG. 10B. Window 305 of application program A includes a push-button control 1005 that controls the sending of selected text to the target application program by the two-terminal redirector program. Window 305 is also shown as including ink data 1010. In FIG. 10C, the user selects the target program as application program B by selecting the appropriate "radio" push-button control in dialog box 1015. Application program B is indicated as selected by the dark circle within the larger radius circle to the left of the label for application program B. Radio push-button controls ensure that only one target program may be selected at a time, but the controls of dialog box 1015 may be modified to allow for the simultaneous selection of multiple target programs.

Figure 10D:
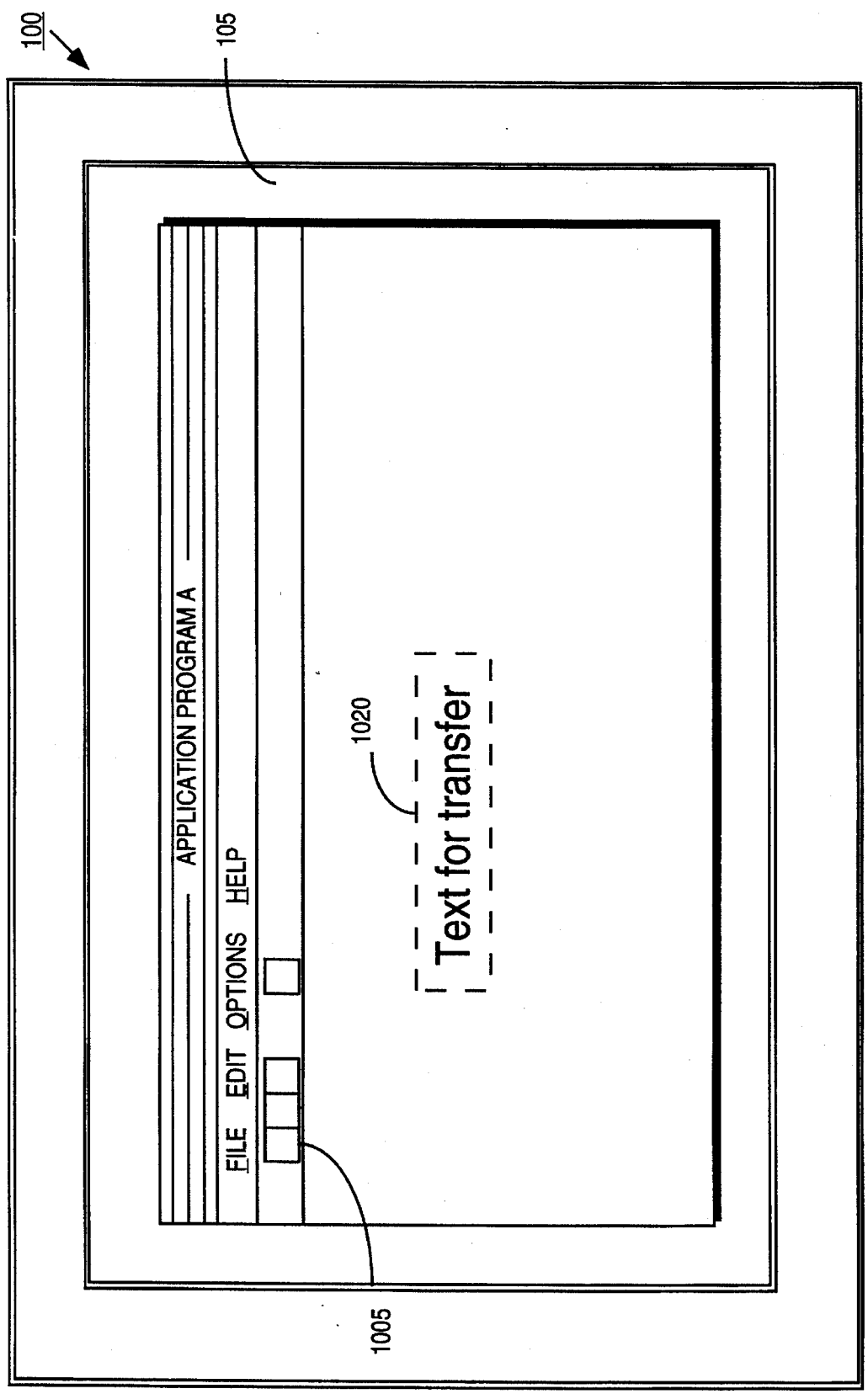
Figure 10E:
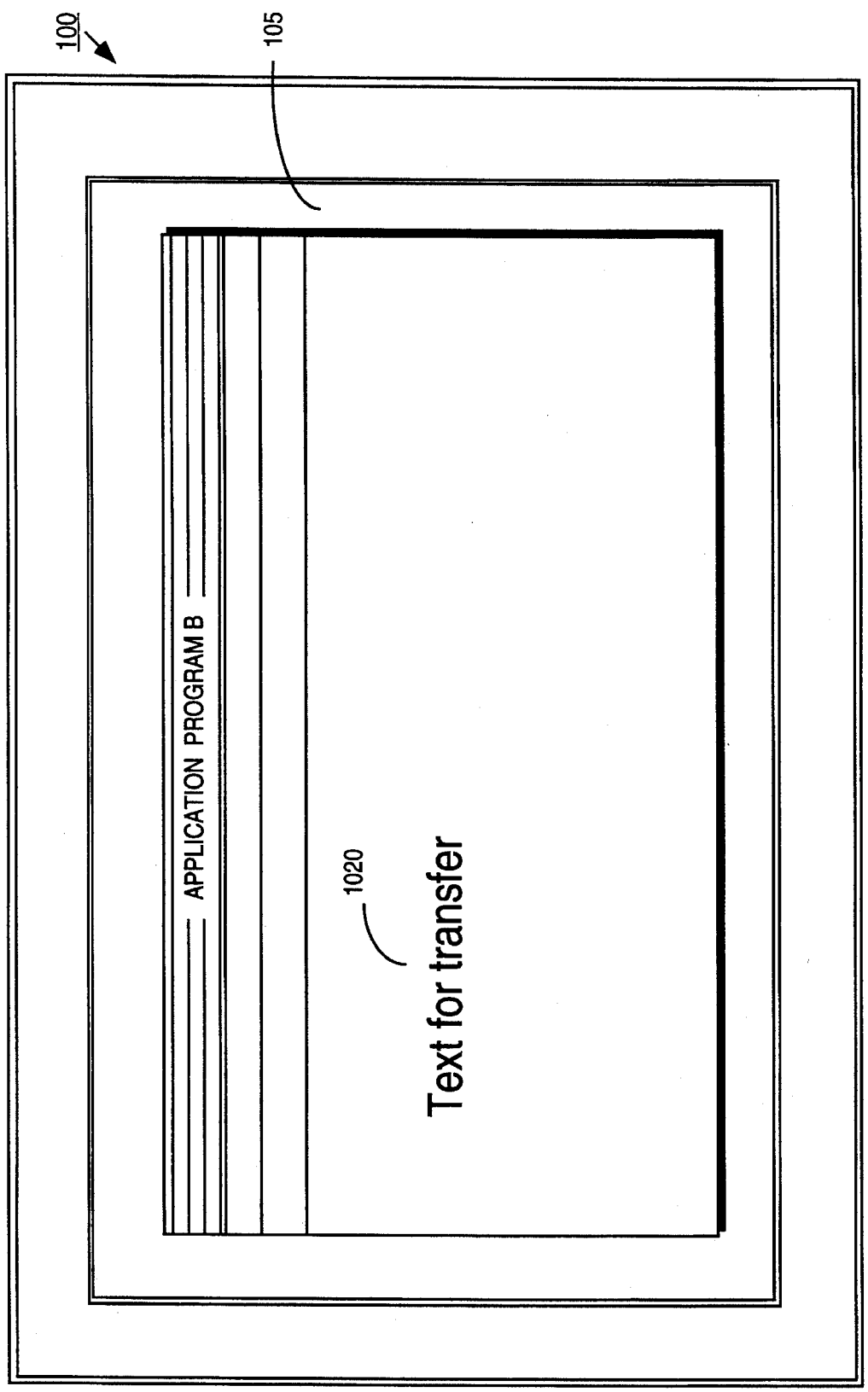

As shown in FIG. 10D, the user has translated the ink data into translated data 1020. Further, a dashed line around the translated data indicates that the translated data has been selected for transfer. Typically, selection is indicated by the "highlighting" the selected text, such as by inverting the colors of the background and the text for the selected text. The user causes the redirector program to transfer the selected data as input messages by selecting the push-button control 1005. As shown in FIG. 10E, the selected text is successfully transferred to the target program, application program B.

Figure 11A:
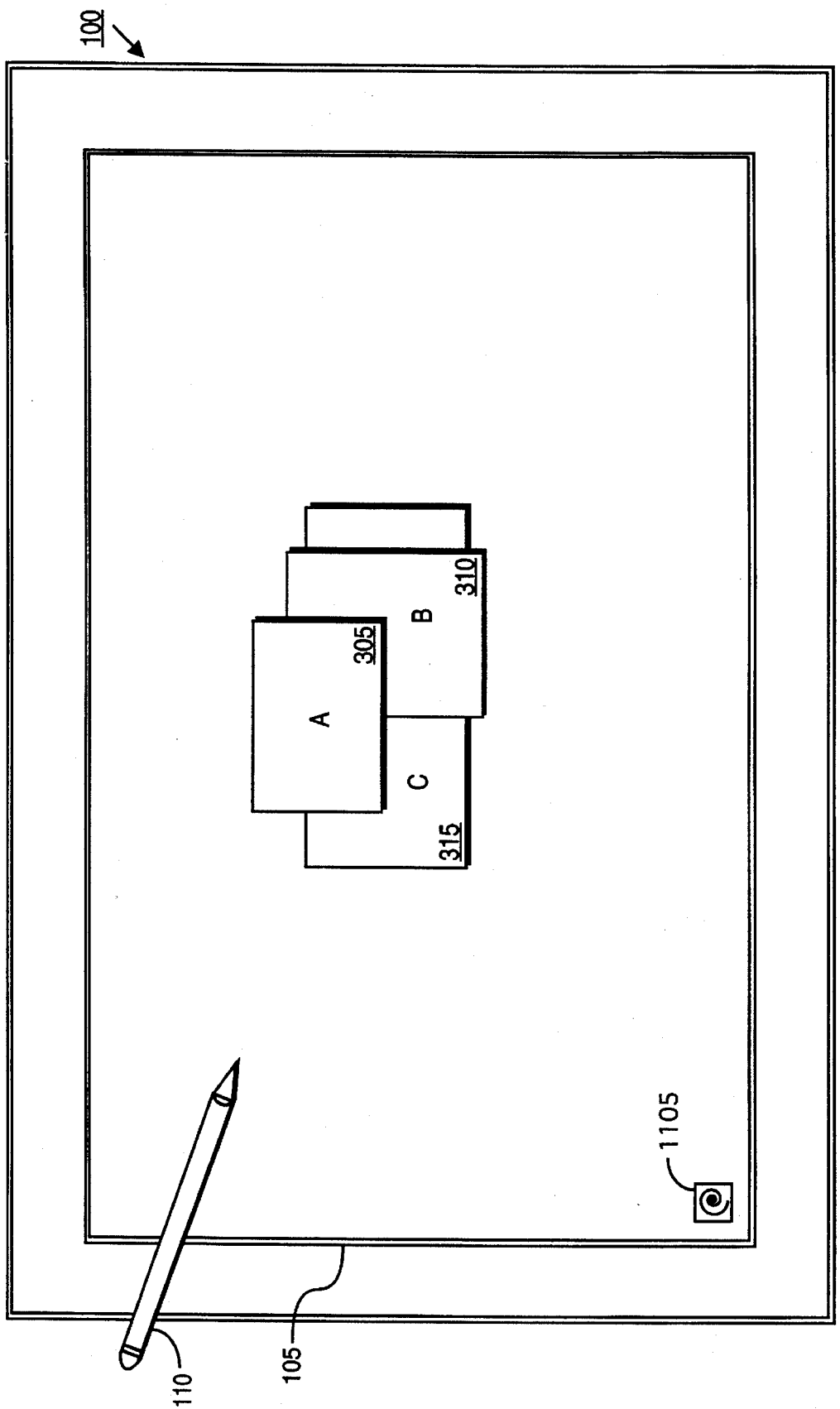
FIGS. 11A–11E illustrate the operation of the GUI method shown in FIG. 8.
Figure 11B:
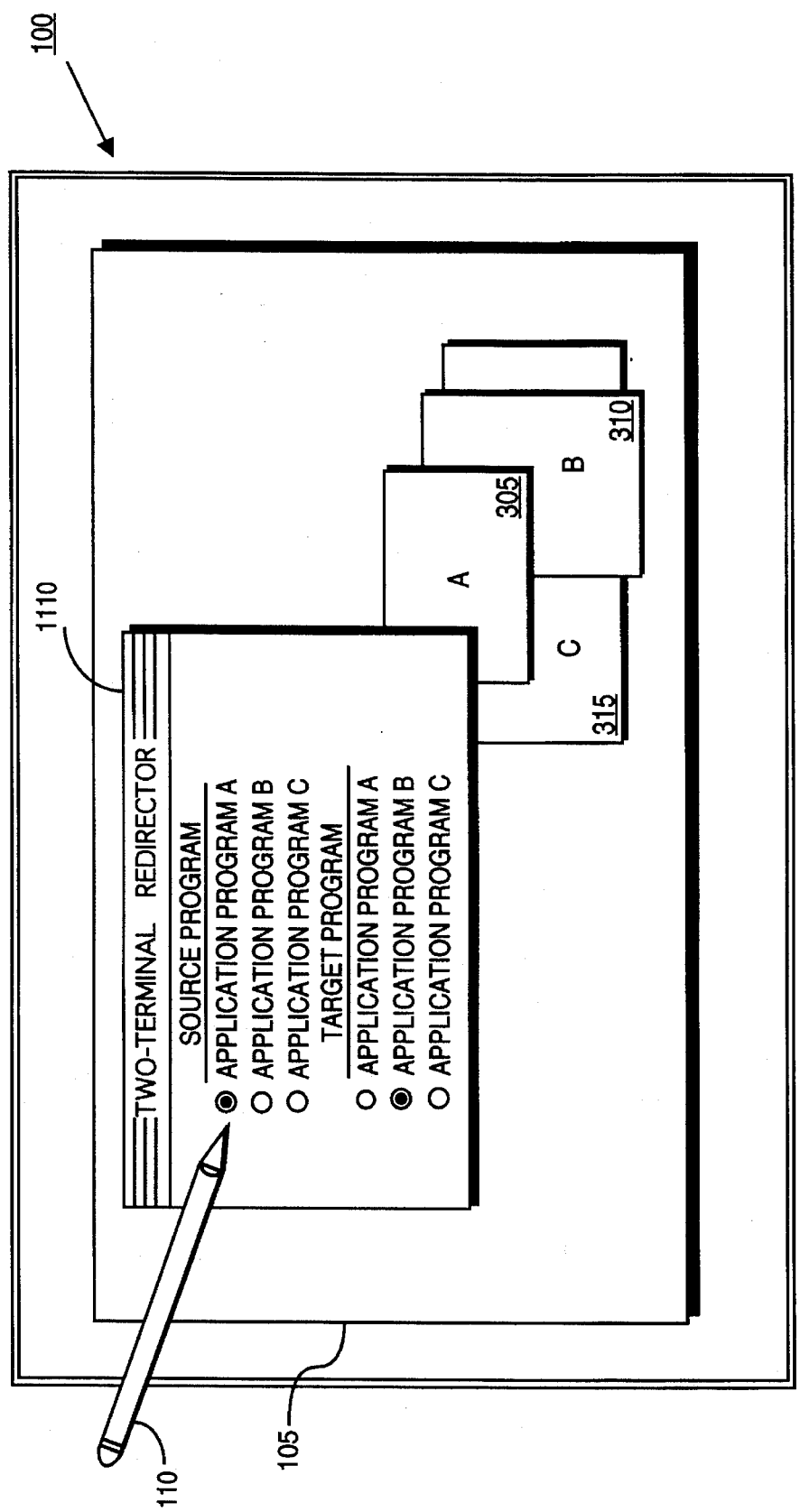

FIGS. 11A–11E illustrate the GUI process shown in FIG. 8 according to one embodiment wherein a sensitive area is created in the window of the source program. FIG. 11A shows that an icon 1105 representative of the redirector program is displayed on the display device 105. The user selects icon 1005 using the pen 110, which may cause a redirector window 1010 to be generated and displayed on the display device 105 as shown in FIG. 11B. The user selects the source and target application programs using the pen 110. According to another embodiment, the source program is selected automatically, and the user is prompted to select only the target program. For the example of FIG. 11B, the user has selected application program A as the source program and application program B as the target program.

Figure 11C:
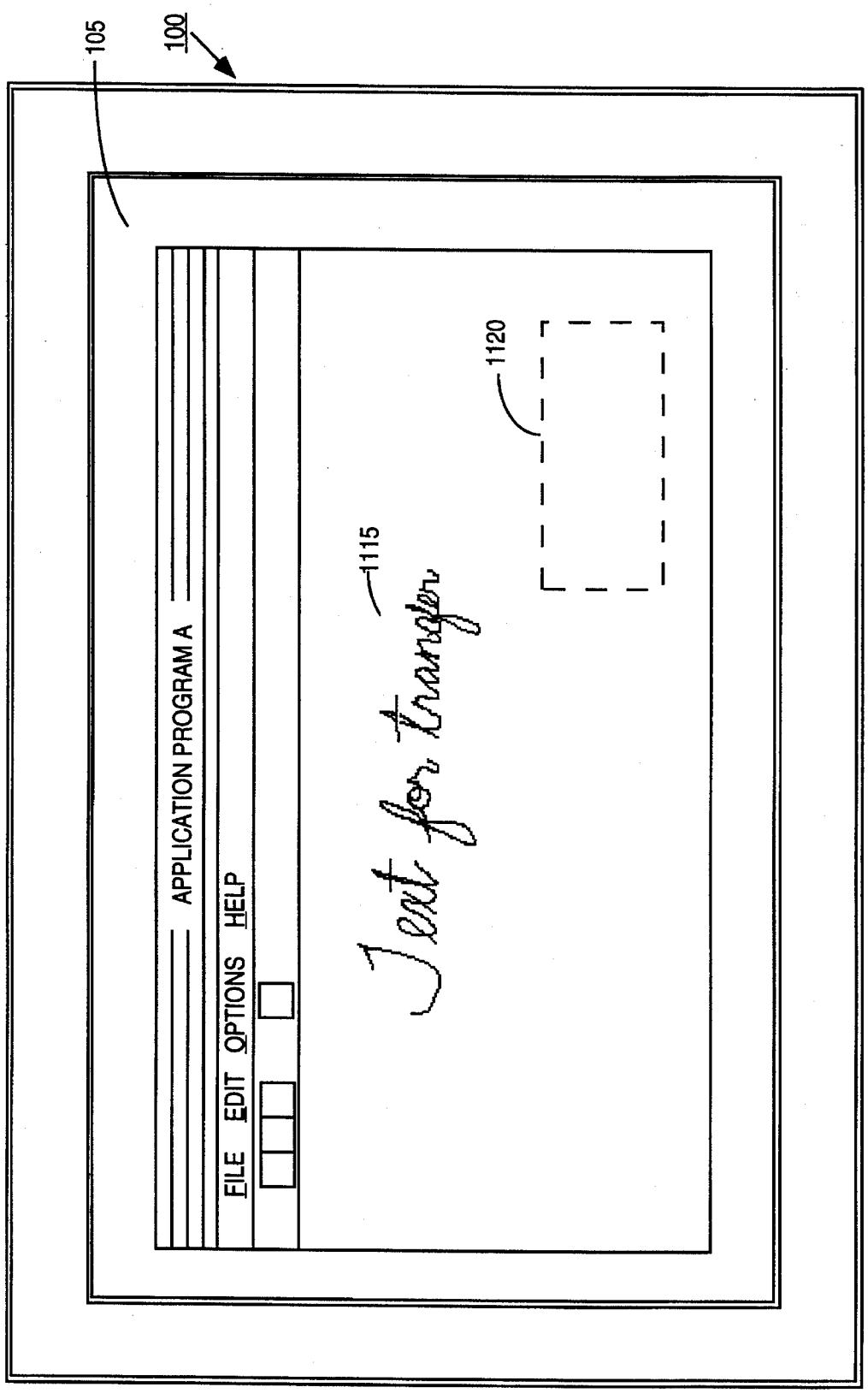
Figure 11D:
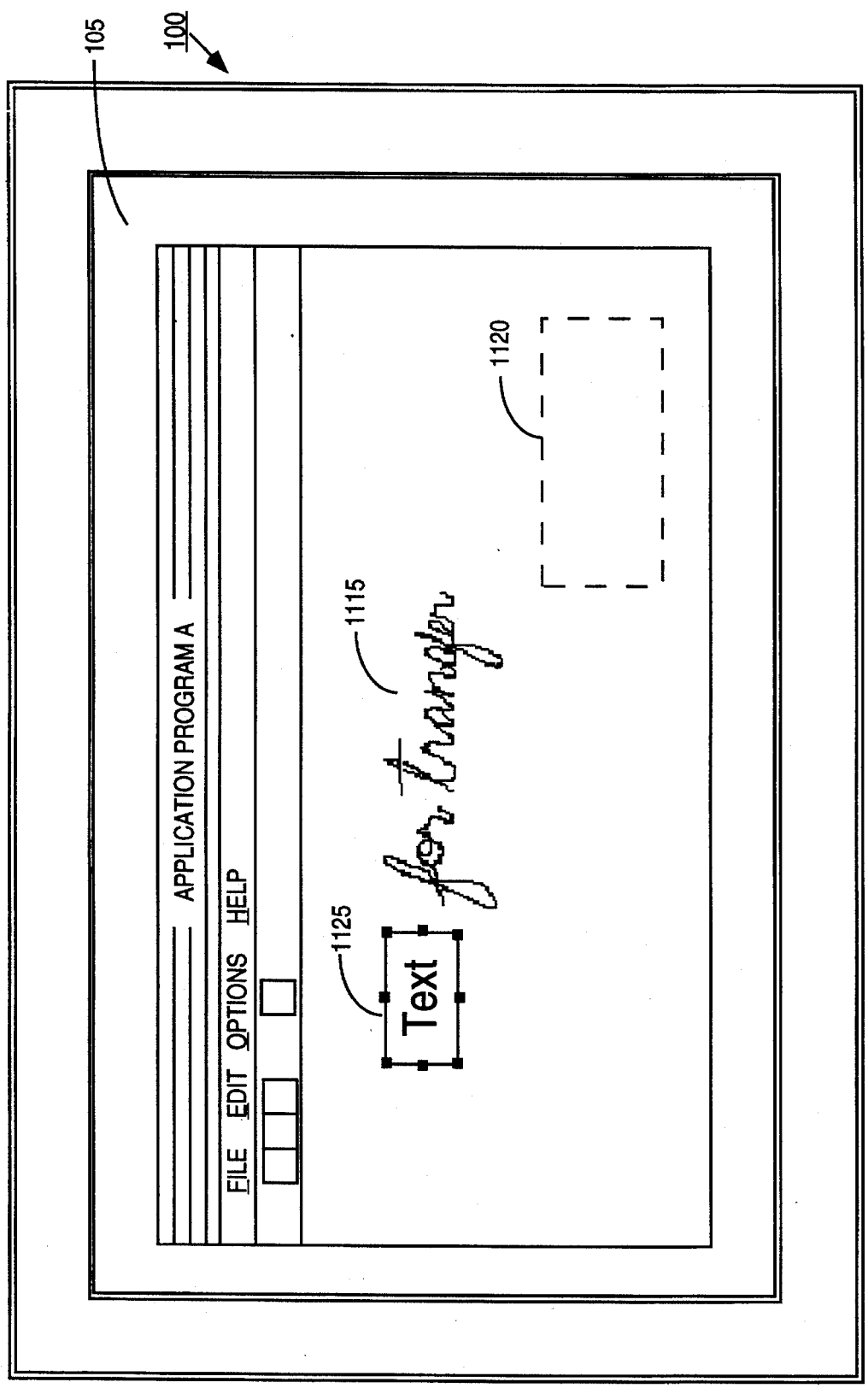
Figure 11E:
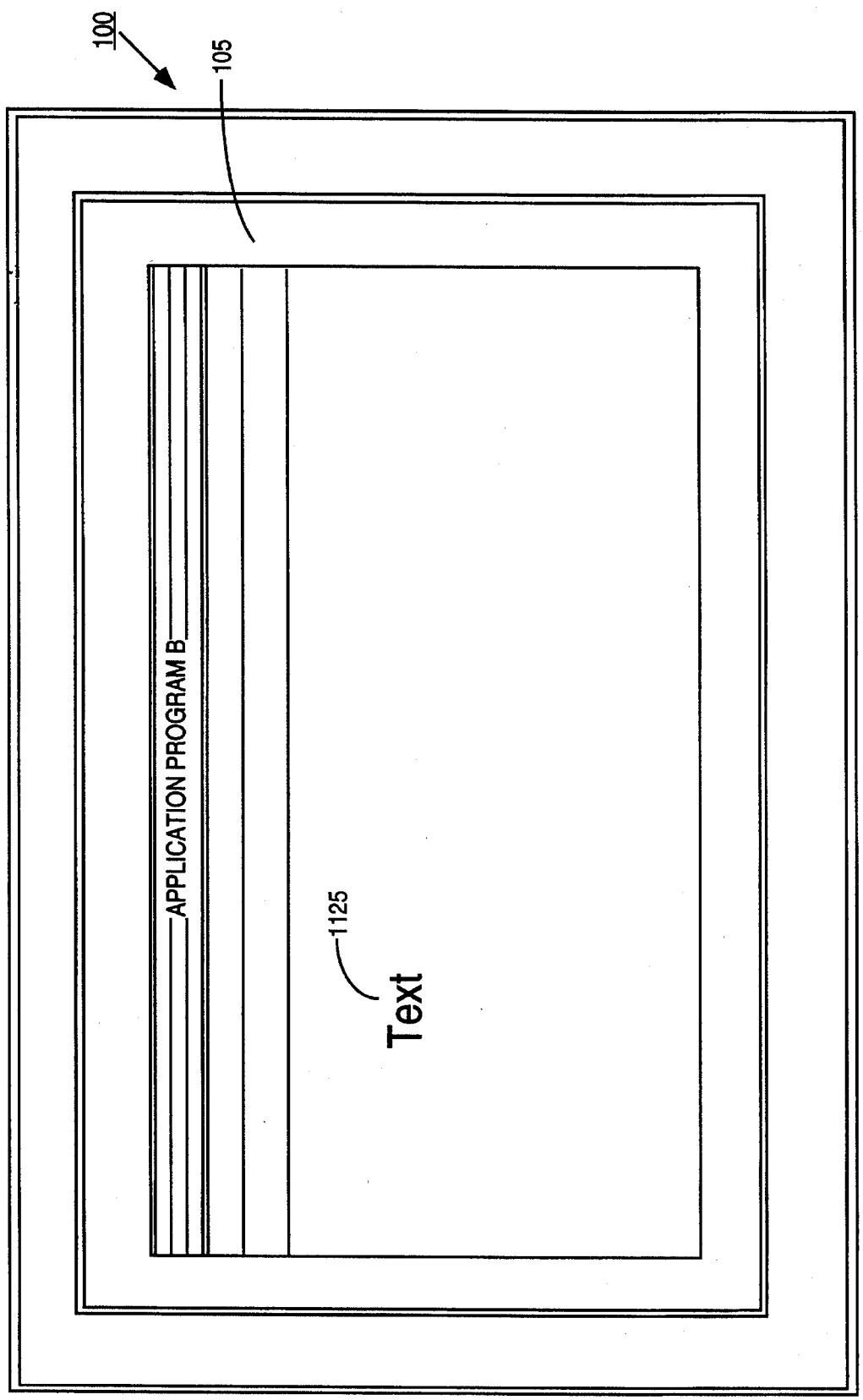

The user selects the window of the source application program A as the active window. As shown in FIG. 11C, the window 305 displays ink data 1115 and a sensitive area 1120. For the present embodiment, ink data must be translated to ASCII characters prior to transfer to the target program by the redirector program. The user selects the ink data for recognition. As described above, ink data may be comprised of a number of distinct ink data objects. For the sake of simplicity, each of the words "text," "for," and "transfer" are distinct ink data objects, although it is possible for a single word to be comprised of multiple ink data objects. Typically, each ink data object is recognized separately. FIG. 11D shows that the user has selected and recognized the word "text." The user may "drag" the translated data 1125 to the sensitive area 1120 and "drop" the translated ink data in the sensitive area 1120. The word "text" is translated into a series of input messages that are sent to the target program, which is application program B. Typically, there is a separate input message for each character of the translated data. FIG. 11E shows that the word text has been entered into the window of application program B.

Figure 12A:
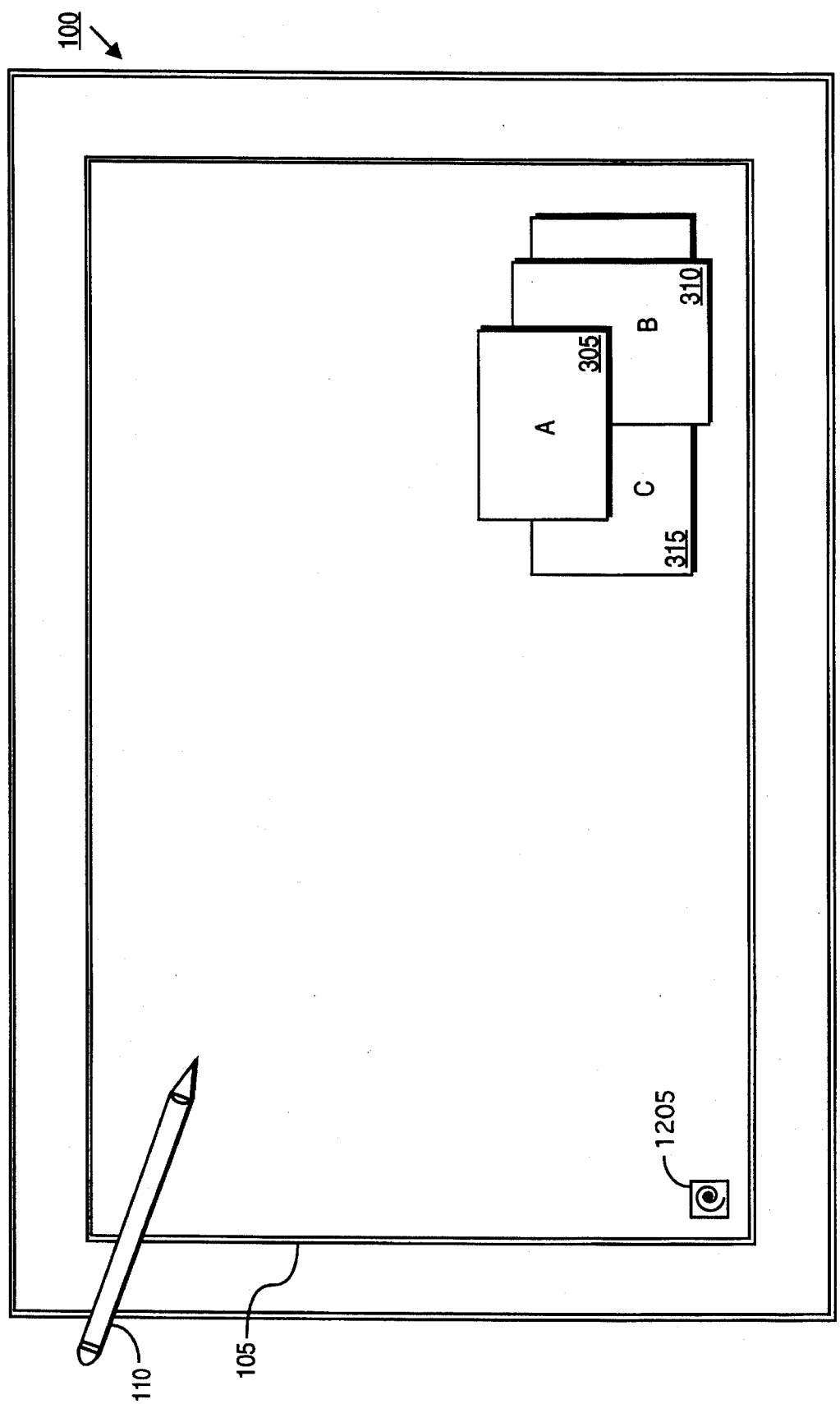
FIGS. 12A–12E illustrate the operation of the GUI method shown in FIG. 9.
Figure 12B:
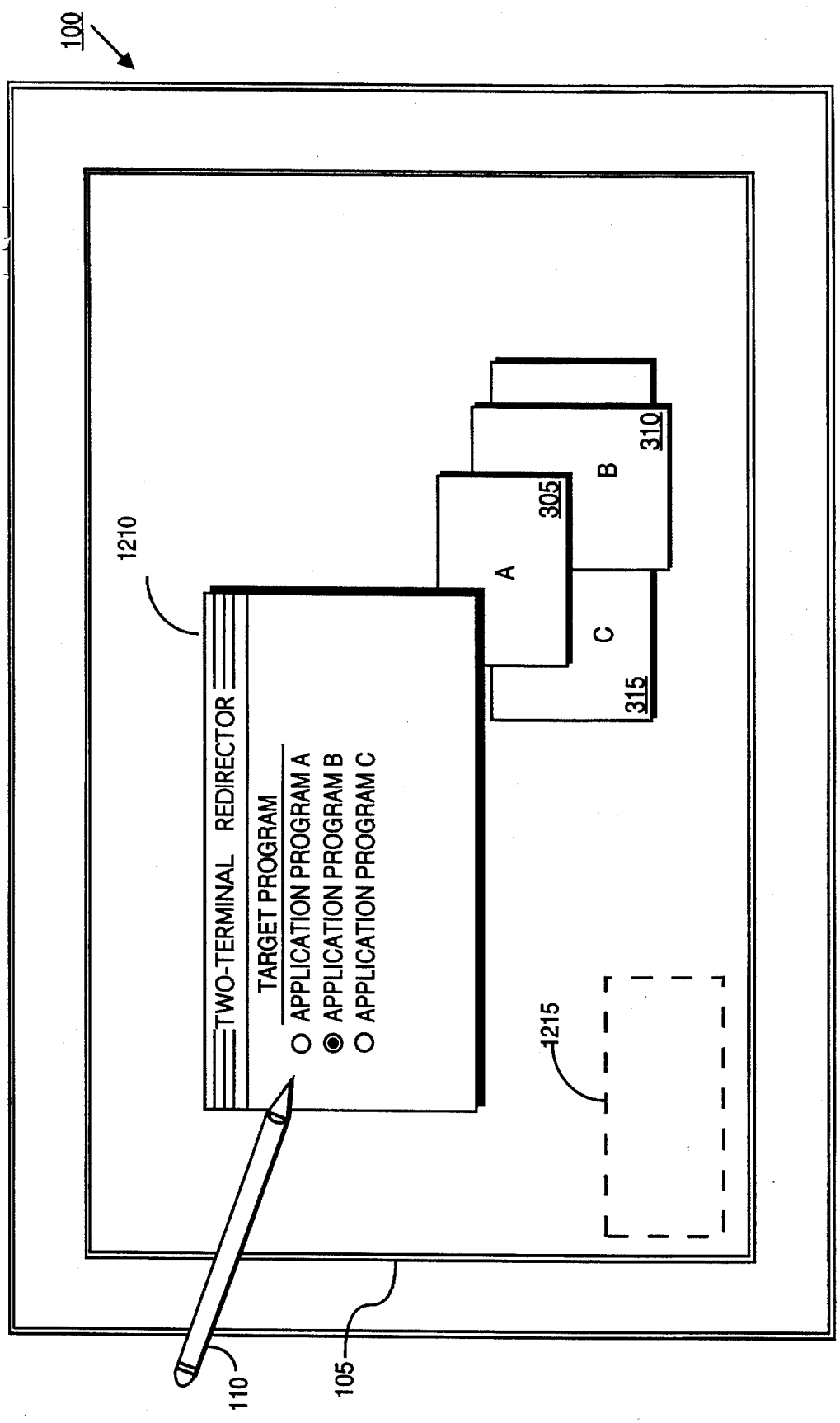

FIGS. 12A–12E illustrate the GUI process shown in FIG. 9 according to one embodiment wherein a sensitive area is created and displayed on the desktop. FIG. 12A shows that an icon 1205 representative of the redirector program is displayed on the display device 105. The user selects icon 1205 using the pen 110, which may cause a redirector window 1210 and a sensitive area 1215 to be generated and displayed on the display device 105, as shown in FIG. 12B.

The user selects the source programs using the pen 110. According to this embodiment, the source program is selected automatically, and the user is prompted to select only the target program. For the example of FIG. 12B, the user has selected application program B as the target program.

Figure 12C:
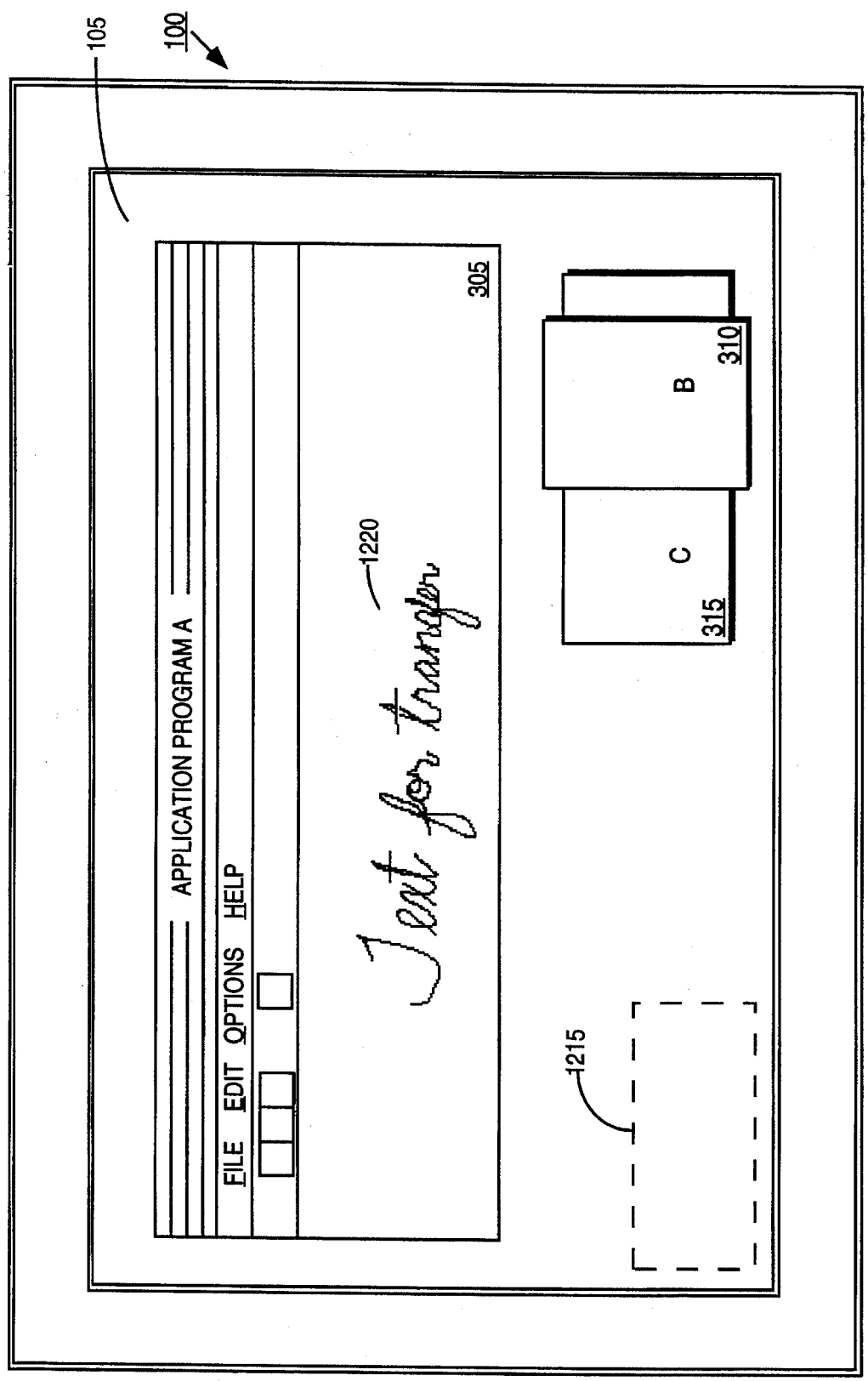
Figure 12D:
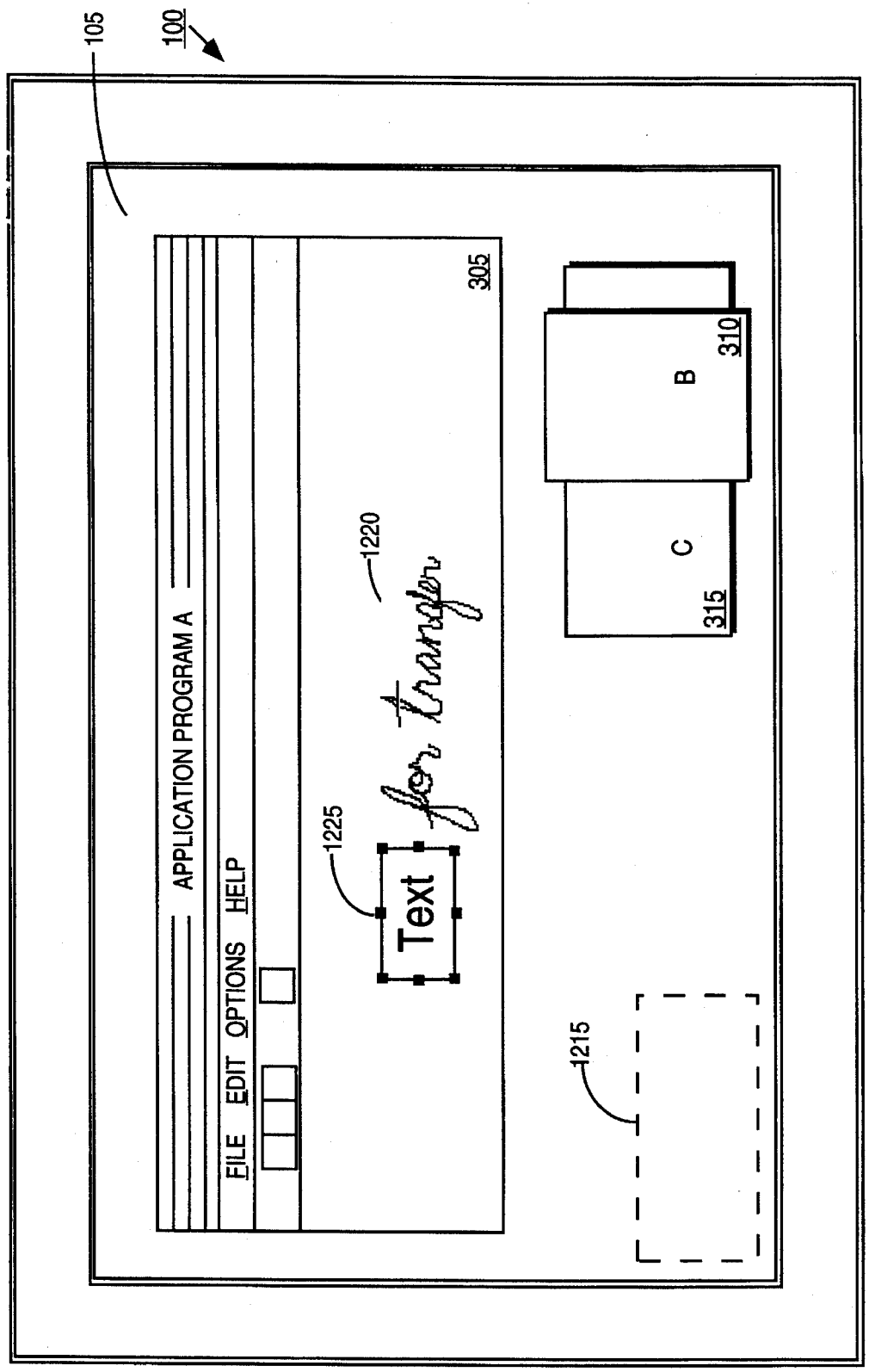
Figure 12E:
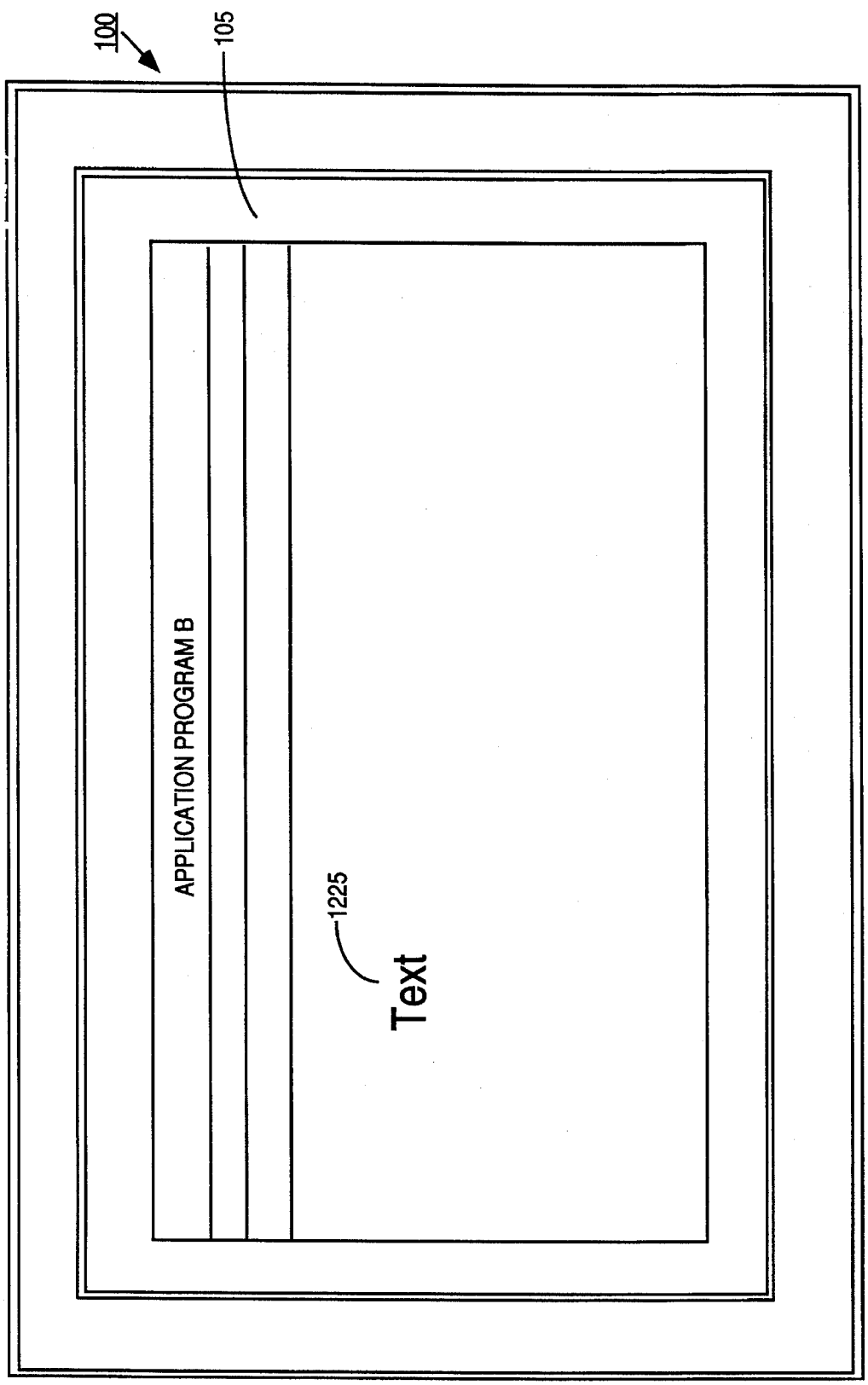

The user selects the window of the application program A as the active window, which automatically selects application program A as the source program. FIG. 12C shows that the window for application program A includes ink data 120. As described above, the user may select ink data for recognition. FIG. 12D shows that the user has selected and recognized the word "text." The user may "drag" the translated data 1225 to the sensitive area 1215 and "drop" the translated ink data in the sensitive area 1215. The word "text" is translated into a series of input messages that are sent to the target program, which is application program B. FIG. 12E shows that the word text has been entered into the window of application program B.

According to other embodiments of the GUI method shown in FIG. 9, the generation and display of a sensitive area may not be required. For example, wherein a "task bar" comprising one or more icons that indicate the inactive programs that are currently being executed by the computer system 100, the act of the user dragging and dropping selected data on an icon may be interpreted by the redirector program as a request to send the selected data to the program represented by the icon.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A user interface method for use in a computer system transferring data between a source program and a target program, comprising the steps of:

selecting a source program by a user;

selecting a target program by the user;

selecting a portion of data in the source program for transfer to the target program by the user;

requesting transfer of the data to the target program by the user; and transferring the portion of data to the target program as at least one input message by a processor, wherein each input message corresponds to a keystroke of a keyboard.

2. The method of claim 1, wherein the step of selecting the source program comprises the step of the user selecting an active window that corresponds to the source program.

3. The method of claim 1, wherein the step of selecting the source program comprises the steps of:

generating a dialog box including a list of at least one program that is capable of being the source program by the processor;

displaying the dialog box on a display device by the processor; and selecting the source program from the list by the user.

4. The method of claim 1, wherein the step of selecting the target program comprises the steps of:

generating a dialog box including a list of at least one program that is capable of being the target program by the processor;

displaying the dialog box on a display device by the processor; and selecting the target program from the list by the user.

5. The method of claim 1, wherein the processor generates and displays a sensitive area in a window of the source program, the step of requesting transfer of the data comprising the step of dragging and dropping the data in the sensitive area by the user.

6. The method of claim 1, wherein the processor generates and displays a sensitive area on a desktop, the step of requesting transfer of the data comprising the step of dragging and dropping the data in the sensitive area by the user.

7. The method of claim 1, wherein the processor generates and displays an icon for each program that may be the target program, the step of requesting transfer of the data comprising the step of dragging and dropping the data on a selected icon by the user.

8. In a computer system having a display device that provides for the entry of ink data, a user interface method for entering data into a target program, the method comprising the steps of:

generating a dialog box by a processor, wherein the dialog box accepts entry of ink data;

displaying the dialog box by the processor on the display device for data entry by a user;

selecting the target program by the user;

entering ink data in the dialog box by the user;

translating the ink data into translated data by the processor, wherein the translated data is in a format used by the target program;

requesting transfer of the translated data to the target program by the user by dragging and dropping the translated data on a selected icon; and transferring the translated data to the target program by the processor as at least one input message, wherein each input message corresponds to a keystroke of a keyboard.

9. In a computer system having a display device, a method for transferring data from a source program to a target program, the method comprising the steps of:

generating a first window for the source program;

displaying the first window;

generating a task list that specifies a plurality of programs as being executed by the computer system;

displaying the task list;

selecting the target program from the task list in response to a first selection of the user;

displaying an indicator for indicating a selected program of the task list as being the target program;

selecting data displayed in the first window for transfer to the target program in response to a second selection of the user, wherein said second selection comprises dragging and dropping said data into a sensitive area in said first window;

transferring data selected by the user to the target program in response to a third selection of the user, wherein the first window remains active when the data is transferred.

10. The method of claim 9, wherein the source program accepts entry of ink data, the method further including the step of translating ink data structures in the first window to ASCII characters in response to a third selection by the user before the step of transferring data occurs.

11. The method of claim 9, wherein the source program accepts data structures according to a first format and the target program cannot operate on data structures having the first format, the method further comprising the step of translating data structures having the first format to data structures having a format that the target program can operate on in response to a third selection of the user before the step of transferring data occurs.

12. The method of claim 9, further comprising the step of displaying the data sent to the target program in a window for the target program.

13. The method of claim 9, the step of sending data entered into the dialog box to the target program comprising the step of sending at least one input message to the target program, wherein each input message corresponds to a keystroke of a keyboard.

14. In a computer system having a display device, a method for transferring data from a source program to a target program, the method comprising the steps of:

generating a first window for the source program;

displaying the first window;

displaying an icon indicating a transfer operation of data selected from the first window to the target program;

generating a task list that specifies a plurality of application programs as being executed by the computer system;

displaying the task list;

selecting the target program from the task list in response to a first selection of the user;

displaying an indicator for indicating a selected application program of the task list as being the target application;

selecting a portion of said data displayed in the first window for transfer to the target program in response to a second selection of the user;

transferring data selected by the user to the target program in response to the user selecting the icon, wherein the first window remains active when the data is transferred.

15. The method of claim 14, wherein the source program accepts entry of ink data, the method further including the step of translating ink data structures in the first window to ASCII characters in response to a third selection by the user before the step of transferring data occurs.

16. The method of claim 14, wherein the source program accepts data structures according to a first format and the target program cannot operate on data structures having the first format, the method further comprising the step of translating data structures having the first format to data structures having a format that the target program can operate on in response to a third selection of the user before the step of transferring data occurs.

17. The method of claim 14, further comprising the step of displaying the data sent to the target program in a window for the target program.

18. The method of claim 14, the step of sending data entered into the dialog box to the target program comprising the step of sending at least one input message to the target program, wherein each input message corresponds to a keystroke of a keyboard.

19. In a computer system having a display device, a method for transferring data from a source program to a target program, the method comprising the steps of:

generating a first window for the source program;

displaying the first window;

generating a sensitive area in the first window;

displaying an indication of a location of the sensitive area;

generating a task list that specifies a plurality of application programs as being executed by the computer system;

displaying the task list;

selecting the target program from the task list in response to a first selection of the user;

displaying an indicator for indicating a selected application program of the task list as being the target application;

selecting data displayed in the first window for transfer to the target program in response to a second selection of the user;

dragging selected data to the sensitive area by the user;

transferring the selected data to the target program in response to the user dropping the selected data in the sensitive area, wherein the first window remains active when the data is transferred.

20. The method of claim 19, wherein the source program accepts entry of ink data, the method further including the step of translating ink data structures in the first window to ASCII characters in response to a third selection by the user before the step of transferring data occurs.

21. The method of claim 19, wherein the source program accepts data structures according to a first format and the target program cannot operate on data structures having the first format, the method further comprising the step of translating data structures having the first format to data structures having a format that the target program can operate on in response to a third selection of the user before the step of transferring data occurs.

22. The method of claim 19, further comprising the step of displaying the data sent to the target program in a window for the target program.

23. The method of claim 19, the step of sending data entered into the dialog box to the target program comprising the step of sending at least one input message to the target program, wherein each input message corresponds to a keystroke of a keyboard.

\* \* \* \* \*

UNITED STATES PATENT AND TRADEMARK OFFICE
CERTIFICATE OF CORRECTION

PATENT NO. : 5,606,674
DATED : February 25, 1997
INVENTOR(S) : Kenneth A. Root It is certified that error appears in the above-identified patent and that said Letters Patent is hereby corrected as shown below:

In column 3 at line 18 insert --form.-- following "diagram".

In column 11 at line 10 delete "120." and insert --1220.--

Signed and Sealed this

Seventeenth Day of June, 1997

*Attest:*

BRUCE LEHMAN

*Attesting Officer*     Commissioner of Patents and Trademarks